(12) United States Patent
Nagata et al.

(10) Patent No.: US 12,300,060 B2
(45) Date of Patent: *May 13, 2025

(54) INTELLIGENT TABLE GAME AND METHODS THEREOF

(71) Applicant: NRT Technology Corp., Toronto (CA)

(72) Inventors: Steven L. Nagata, Henderson, NV (US); Nasr F. Sattar, Las Vegas, NV (US); Joshua W. Sidsworth, Toronto (CA); Ryan P. McClellan, Grosse Pointe, MI (US); Joseph Alexander Coady, Oro-Medonte (CA)

(73) Assignee: NRT TECHNOLOGY CORP., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,311

(22) Filed: Jun. 15, 2023

(65) Prior Publication Data

US 2023/0326285 A1 Oct. 12, 2023

Related U.S. Application Data

(63) Continuation of application No. 16/696,365, filed on Nov. 26, 2019, now Pat. No. 11,682,257.

(60) Provisional application No. 62/772,872, filed on Nov. 29, 2018.

(51) Int. Cl.
*A63F 9/24* (2006.01)
*A63F 11/00* (2006.01)
*G06F 13/00* (2006.01)
*G06F 17/00* (2019.01)
*G06V 20/52* (2022.01)
*G06V 40/16* (2022.01)
*G06V 40/20* (2022.01)
*G07F 17/32* (2006.01)
*H04N 23/90* (2023.01)
*H04N 23/54* (2023.01)

(52) U.S. Cl.
CPC .......... *G07F 17/3211* (2013.01); *G06V 20/52* (2022.01); *G06V 40/172* (2022.01); *G06V 40/20* (2022.01); *G07F 17/322* (2013.01); *G07F 17/3239* (2013.01); *G07F 17/3241* (2013.01); *G07F 17/3248* (2013.01); *G07F 17/3255* (2013.01); *H04N 23/90* (2023.01); *G07F 17/3288* (2013.01); *G07F 17/3293* (2013.01); *H04N 23/54* (2023.01)

(58) Field of Classification Search
CPC .. G07F 17/32; G07F 17/3211; G07F 17/3214; G07F 17/3222
USPC ........................ 463/1, 20, 22, 25, 30, 39, 40
See application file for complete search history.

(56) References Cited

U.S. PATENT DOCUMENTS

| | | | | |
|---|---|---|---|---|
| 11,340,756 | B2 * | 5/2022 | Faulkner | G06F 3/011 |
| 2021/0303897 | A1 * | 9/2021 | Kelly | H04N 23/62 |
| 2022/0187964 | A1 * | 6/2022 | Jensen | G06F 16/90335 |

* cited by examiner

*Primary Examiner* — Adetokunbo O Torimiro
(74) *Attorney, Agent, or Firm* — Frost Brown Todd LLP

(57) ABSTRACT

Systems and methods for camera-based player and gameplay tracking in a gaming environment are provided. Cameras positioned proximate to the table game can also be used to capture and verify various transactions between the players and the dealer. And informational overlay is graphically displayed on a dealer interface system to display player information to allow for manual entry of the information into input fields of the dealer interface system.

20 Claims, 13 Drawing Sheets

INTELLIGENT TABLE GAME AND METHODS THEREOF

CROSS-REFERENCE TO RELATED APPLICATIONS

This application is a continuation of U.S. Ser. No. 16/696,365, filed on Nov. 26, 2019, which claims the benefit of U.S. provisional patent application Ser. No. 62/772,872, filed on Nov. 29, 2018, entitled INTELLIGENT TABLE GAME AND METHODS THEREOF, the disclosure of which is incorporated herein by reference in its entirety.

BACKGROUND

Playing casino table games is a popular form of entertainment. While most people on the player's side of the table view this as a simple process, on the procedural/business side, there are many processes that are being performed. For example, procedures associated with various types of table games include counting money out at the table, distributing chips to players at the table, rating players at the table, rating refused name players at the table and notating the details of the player if they buy-in for a large amount of money and choose to be unknown (i.e., relevant to anti money laundering (AML) monitoring), and determining the outcome of a round of play.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
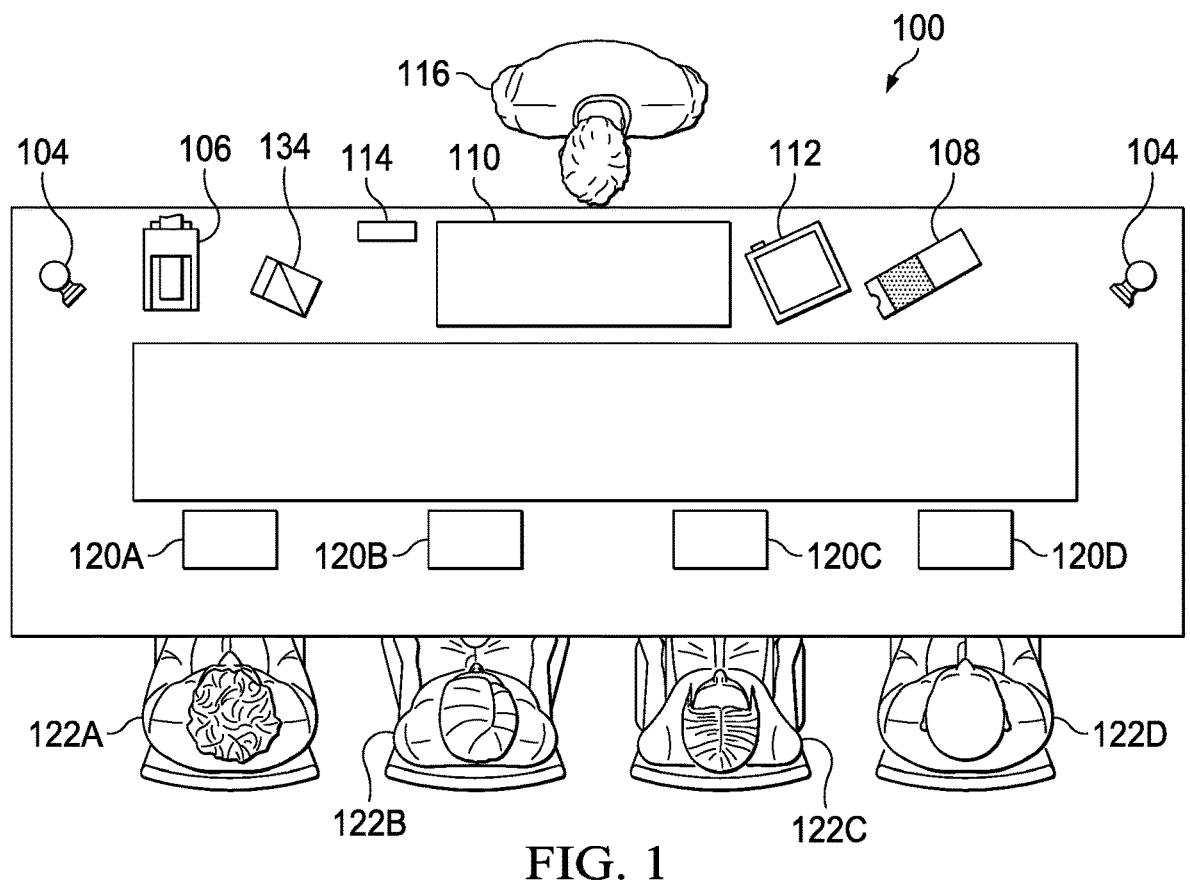
FIGS. 1-2 depict a simplified diagram of an example table game and associated hardware for intelligent table gaming according to one non-limiting embodiment.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-20 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, then are described.

As described in more detail below, the present disclosure generally relates to intelligent table games that allow for detection and processing of events that occur at gaming tables through real time analysis and/or post processing and process management. In accordance with the present disclosure, one or more of the following features or functionalities can be enabled or otherwise provided. Fast and secure transactions can be performed at a gaming table through local processing, remote processing, or a combination of local and remote processing. A variety of transactions can be audited. Bets can be recognized and tracked, including the value of the bet and the player placing the bet. Such bet monitoring can be performed by cameras, and/or proximity tracking, among other techniques. In some embodiments, the analysis is coupled with appendage detection or other forms of image analysis in order to associate certain activities with a particular player. Players can be automatically rated and their win/loss records can be tracked. Electronic markers can be signed for on a wireless device at the table. Moreover, facial recognition can be utilized to provide for player ratings, AML monitoring and alerting, identification of desirable and undesirable players. It is to be appreciated that, in accordance with the present disclosure, game pace can be increased and staffing needs can be reduced.

Many events occur at a gaming table in a casino environment, often simultaneously. The systems and methods described herein allow for such events to be captured and analyzed in an automated fashion. In some example embodiments, a system can include cameras, of similar or different types, positioned proximate to the gaming table and a processor, or multiple processors, to determine events that occur based on image feeds from the camera. In some example embodiments, one or more additional sensors (such as RFID sensors, magnetic field sensors, and so forth) can be incorporated into the gaming table, or elsewhere, to provide additional information to the system. Software can be applied to that image data and/or sensor data to understand these events and how to assign tasks to various processes in order to disseminate what had occurred or, in some cases, to determine what is about to occur. Details regarding example approaches for processing the data collected from various sources can be found in U.S. Ser. No. 16/102,138, filed Aug. 13, 2018, which is incorporated herein by reference.

Referring first to FIG. 1, a simplified version of an example table game 100 is schematically illustrated. The table game 100 can be any of a variety of table games offered for gameplay in a gaming environment and as such, the table game 100 shown in FIG. 1 is not to be limited to any particular type of game. For the purposes of illustration, the table game 100 is shown with a dealer 116 positioned opposite of four players 122A-D. The table game 100 is shown to have a playing field 118 as well as betting fields 120A-D. The table game 100 is also shown to have a dealer tray 110. The table game 100 has a table game surface 102 upon which gameplay transpires. As to be appreciated however, this particular arrangement is non-limiting, as table games can have a variety of arrangements that are all intended to be covered by the present disclosure.

A variety of intelligent or smart devices can be incorporated into the table game 100, or at least incorporated into the gaming environment in which the table game 100 is located. Some embodiments may utilize more or fewer smart devices than those shown in FIG. 1. One or more cameras 104 can be positioned to collect images, either still images or video images, related to the gameplay. The cameras 104 can, therefore, be positioned or mounted to have particular fields of view to capture various aspects of the gameplay. In this regard, one or more cameras can be positioned to collect images of the players. One or more cameras can be positioned to collect images of the dealer. One or more cameras can be positioned to collect images of the chips. One or more cameras can be positioned to collect images of the cards, or other playing devices associated with the gameplay. As is to be appreciated, in some cases, the same camera can be used to collect image data related to different aspects of gameplay. For example, the camera feed from a particular camera can be used for a facial recognition process as well as a bet recognition process. In some embodiments, cameras can be incorporated into various devices that are part of conventional gameplay, such as a discard rack 134.

Figure 2:
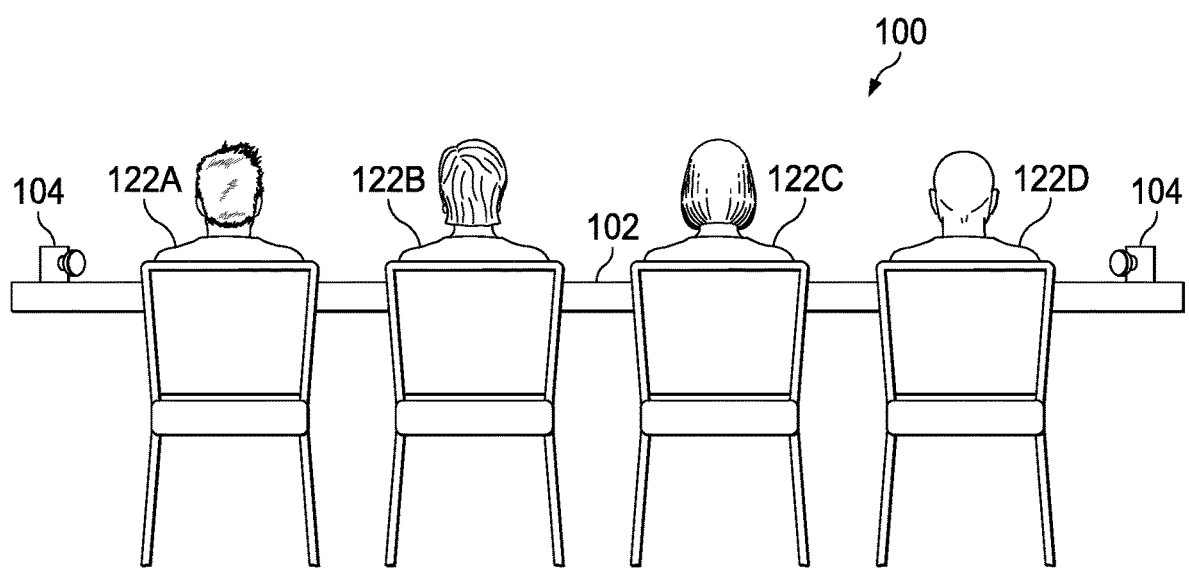

FIG. 2 depicts a side view of the table game 100 to schematically show cameras 104 oriented to collect facial features of the players 122A-D. While the cameras 104 are shown positioned on the table game surface 102, this disclosure is not so limited. Additionally, in some embodiments, one or more of the cameras 104 can be discretely incorporated into devices or other structures associated with the table game 100, as to be minimally distractive or even unnoticeable. As is to be appreciated, cameras 104 can be positioned at various elevations and orientations relative to the table game surface 102 in order to obtain the camera angles necessary to collect the desired data.

Referring again to FIG. 1, the table game 100 can include additional devices that can collect data or otherwise be used to monitor gameplay. For example, the table game 100 can include a card shoe 108 that has one or more sensors that are usable to collect card data. Using the card data, gameplay results can be tracked and logged. As described in more detail below, the data collected by the card shoe 108 can be combined, for example, with image data collected from one or more of the cameras 104 to provide a detailed and real-time overview of the gameplay. In this regard, playing card values can be known as well as the destination of that playing card during gameplay (for instance, dealt to the dealer 116 or one of the players 122A-D). This information can then be used to determine payout amounts, win/loss percentages, player betting strategies, and/or dealer accuracy, among a variety of other gaming related processes. In some embodiments, the table game 100 can include a drop slot 114 that includes one or more sensors for reading bills or other slips deposited therein.

In accordance with various embodiments, the table game 100 can include a dealer interface system 112. The dealer interface system 112 can provide any form of suitable interface for collecting inputs from the dealer 116 and/or displaying information to the dealer 116. The dealer interface system 112 can include any device that conveys information, such as an LCD monitor, a touch screen, a CRT, and so forth. Further, the dealer interface system 112 can be used to display or collect information from any suitable user, such as casino personnel, a pit boss, a supervisor, a floor manager, and so forth. The dealer interface system 112 can also include an input device which can be used to input any input from the user. Any suitable form of input device can be used, such as buttons, a touch screen, a keyboard, mouse, and so forth. While the dealer interface system 112 shown in FIG. 1 is positioned on the table game surface 102, this disclosure is not so limited. In some embodiments, for instance, the dealer interface system 112 can be mounted to the side of the table, mounted to or incorporated into a table sign, or positioned proximate to the dealer tray 110. In some embodiments, the dealer interface system 112 can be associated with a wireless or wired tablet or other communication device.

The dealer interface system 112 can be utilized by the dealer 116 to provide various information related to transactions or other events transpiring at the table game 100. By way of example, the dealer 116 may log buy-ins, cash-outs, color-ups, markers, and the like, through the dealer interface system 112. The dealer interface system 112 can also be used for inputting player loyalty information, such as a player loyalty ID. The dealer interface system 112 can include an optical scanner, a NFC transceiver, or other input device for reading player loyalty information. The dealer interface system 112 can also display information to the dealer 116, such as payout information, as well as various alerts, status updates, player details, game details, or other information. Such alerts can relate to perceived AML activities, perceived cheating, blacklisted players, and so forth.

In some embodiments, the table game 100 can include a table side printer 106. Such table side printer 106 can be positioned on the table game surface 102 or other suitable location, such as in a lower cabinet of the table game 100, or at a centralized stand in a gaming pit, for example. The table side printer 106 can be used to print, for example, receipts, vouchers, coupons, and so forth. The table side printer 106 can be incorporated into another device, such as the dealer interface system 112 or a tabletop sign, for example.

Figure 3:
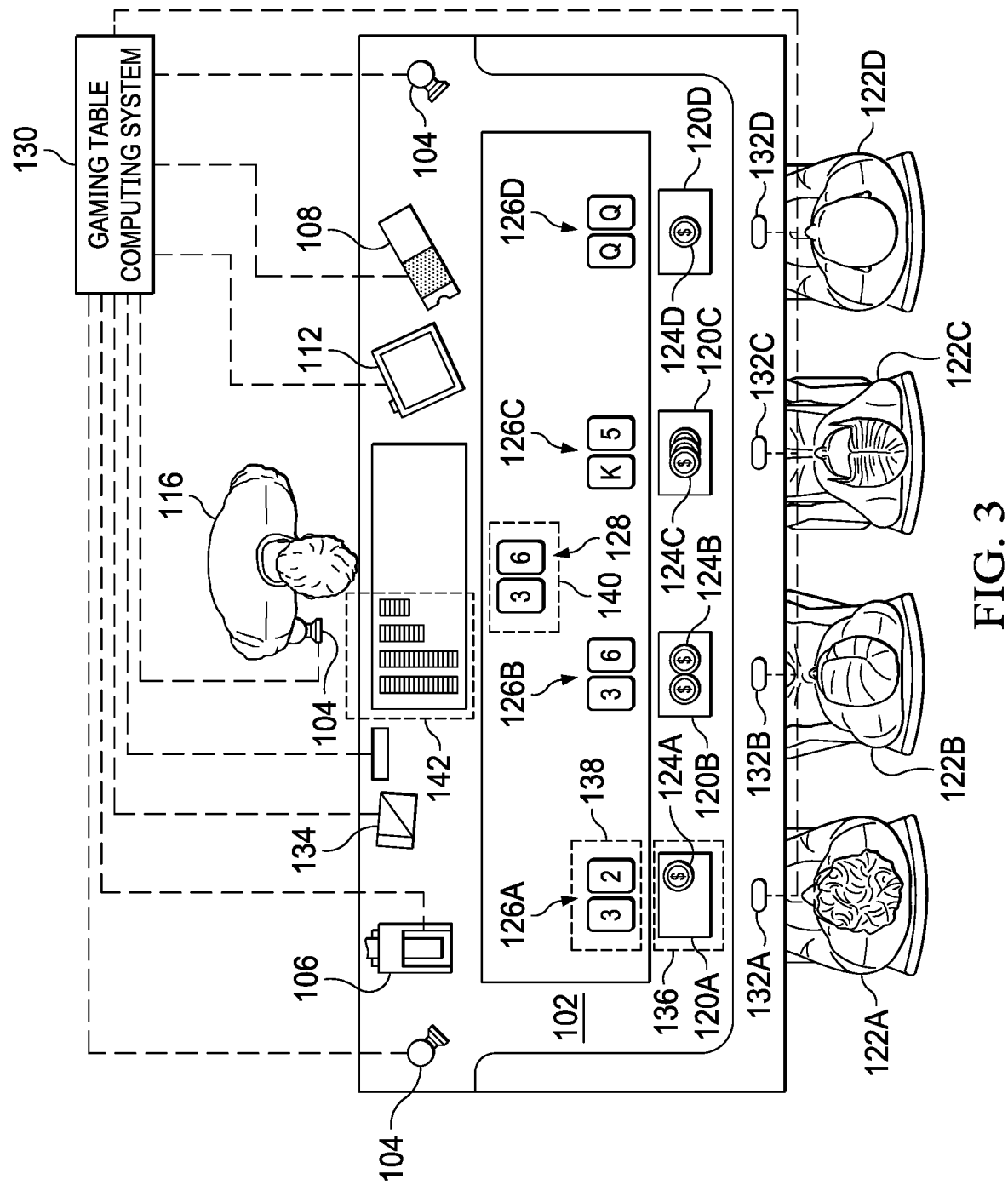
FIG. 3 depicts the example table game of FIGS. 1-2 during example gameplay.

FIG. 3 depicts the example table game of FIGS. 1-2 during example gameplay. For the purposes of illustration, each of the players 122A-D is showing having placed chips 124A-D in their respective betting fields 120A-D. Additionally, playing cards 126A-D have been dealt to the players 122A-D, and playing cards 128 have been dealt to the dealer 116. FIG. 3 also schematically shows a gaming table computing system 130. The gaming table computing system 130 can include one or more components that are either physically located at the table game 100 or positioned remote from the table game 100 and accessible via networked communications. Additional details regarding an example gaming table computing system are provided below at FIG. 19. The gaming table computing system 130 can be in networked communication with data collection devices associated with the table game 100. Such networked communications can utilize any suitable wireless or wired protocol as transmission means. As shown, the gaming table computing system 130 is in communication with cameras 104, the printer 106, the card shoe 108, the dealer interface system 112, the drop slot 114, and the discard rack 134. In this example arrangement, the dealer 116 is shown to be wearing a body camera 104.

In the illustrated embodiment, the gaming table computing system 130 is also in communication with NFC transceivers 132A-D. Such NFC transceivers 132A-D can utilize a suitable communication protocol, such as BLUETOOTH, to provide certain functionality to the players 122A-D. For instance, the players 122A-D may provide data from their mobile communication device to the gaming table computing system 130 related to their loyalty account. Additionally, or alternatively, the NFC transceivers 132A-D can be utilized to transfer value from a stored value account of the player to the table game 100 in exchange for chips. Subsequent to the transactions, a receipt can be printed by the printer 106. While the NFC transceivers 132A-D are shown to be embedded in the rail of the table game 100, this disclosure is not so limited, as such NFC transceivers can be positioned at a variety of different suitable locations.

Using various image feeds and/or other data feeds, the gaming table computing system 130 can track various aspects of the gameplay. For instance, the gaming table computing system 130 can map certain areas of the table game surface 102, such as mapped betting fields 136, mapped playing area 138, mapped dealer playing area 140, and mapped dealer tray 142 and monitor for activity therein. The gaming table computing system 130 can therefore track card values, betting amounts, and other playing data. In some embodiments, for instance, the gaming table computing system 130 can receive card value data from the card shoe 108 or other card handler (such as an automatic shuffler) and then rely on image data collected from the one or more cameras 104 to determine and track where that playing card was placed. The gaming table computing system 130 can also determine payout amounts based on the amount of betting by each of the players 122A-D and the outcome of the hand.

In some embodiments, the gaming table computing system 130 monitors the value of the chips in the dealer tray 110 to determine accuracy of payouts paid to the players 122A-D by the dealer 116. In the event the gaming table computing system 130 detects an overpayment or underpayment scenario, an alert can be generated and provided to various devices, such as the dealer interface system 112, a supervisor, a centralized surveillance office, or other appropriate recipient(s). Additional details regarding example dealer trays are provided below.

Figure 4:
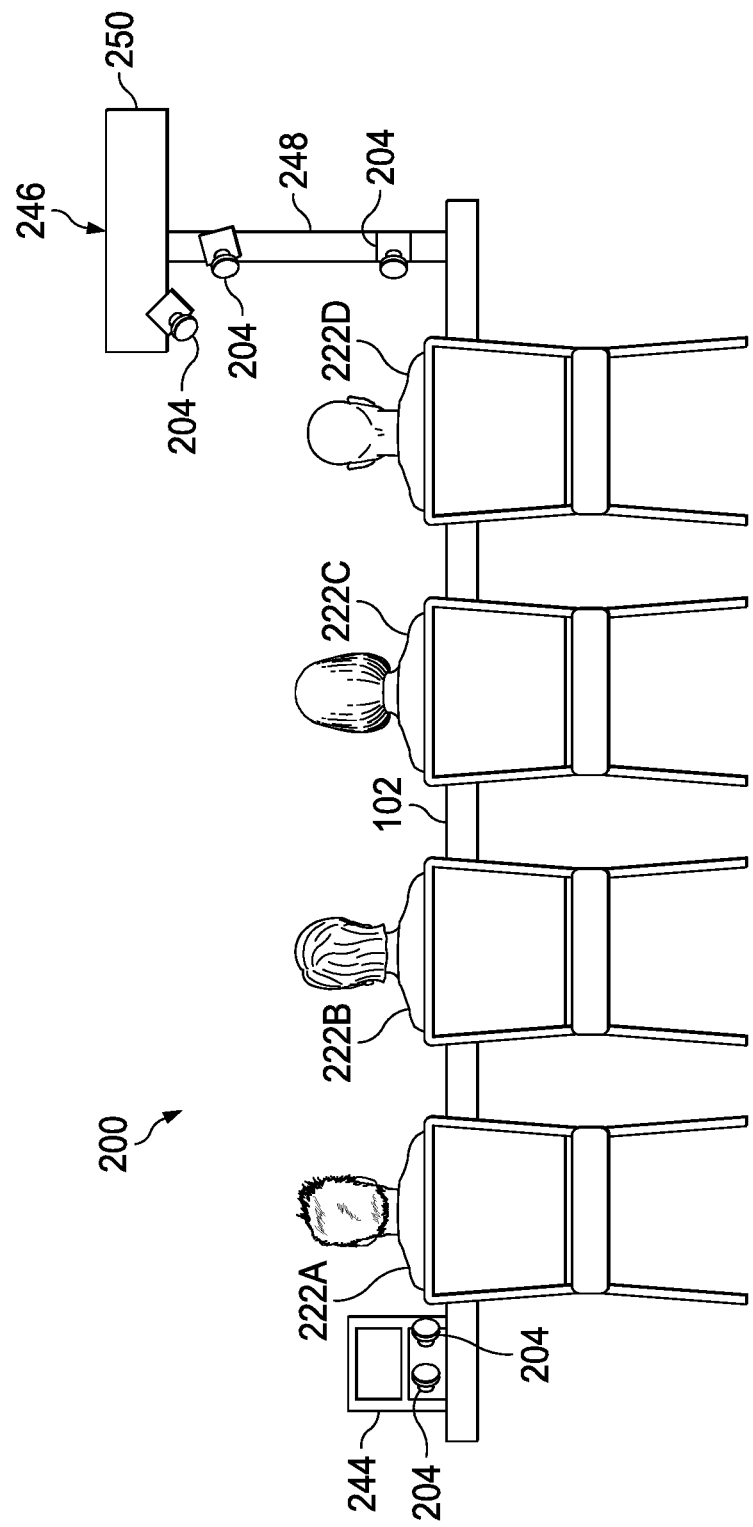
FIG. 4 depicts another example table game and associated hardware for intelligent table gaming in accordance with one non-limiting embodiment.

FIG. 4 depicts another example table game 200 and associated hardware for intelligent table gaming in accordance with one non-limiting embodiment. Similar to FIG. 2, players 222A-D can be tracked by one or more cameras 204 that are placed proximate to the table game 200. In the illustrated embodiment, a first set of cameras 204 are embedded in a first table sign 244 on a first side of the table game 200. In the illustrated embodiment, a second table sign 246 is positioned on the opposite side of the table game 200. The second table sign 246 has a support pole 248 and signage 250 coupled thereto. One or more cameras 204 can be coupled to or integrated with the support pole 248. Additionally or alternatively, one or more cameras 204 can be coupled to or integrated with the signage 250. In some cases, the second table sign 246 can be existent signage that is retrofitted with the cameras 204. Further, some table games may have other suitable structures positioned proximate to the table that allows for cameras 204 to be added thereto. The placement of each of the cameras 204 can be selected to have a particular field of view that is usable by an associated gaming table computing system for image analysis. In this regard, certain cameras 204 can be positioned to capture facial features of the players 222A-D, while other cameras 204 can be positioned to provide an aerial view of the playing field. Other cameras 204 can be positioned to capture a dealer tray or a drop slot, for example.

Figure 5:
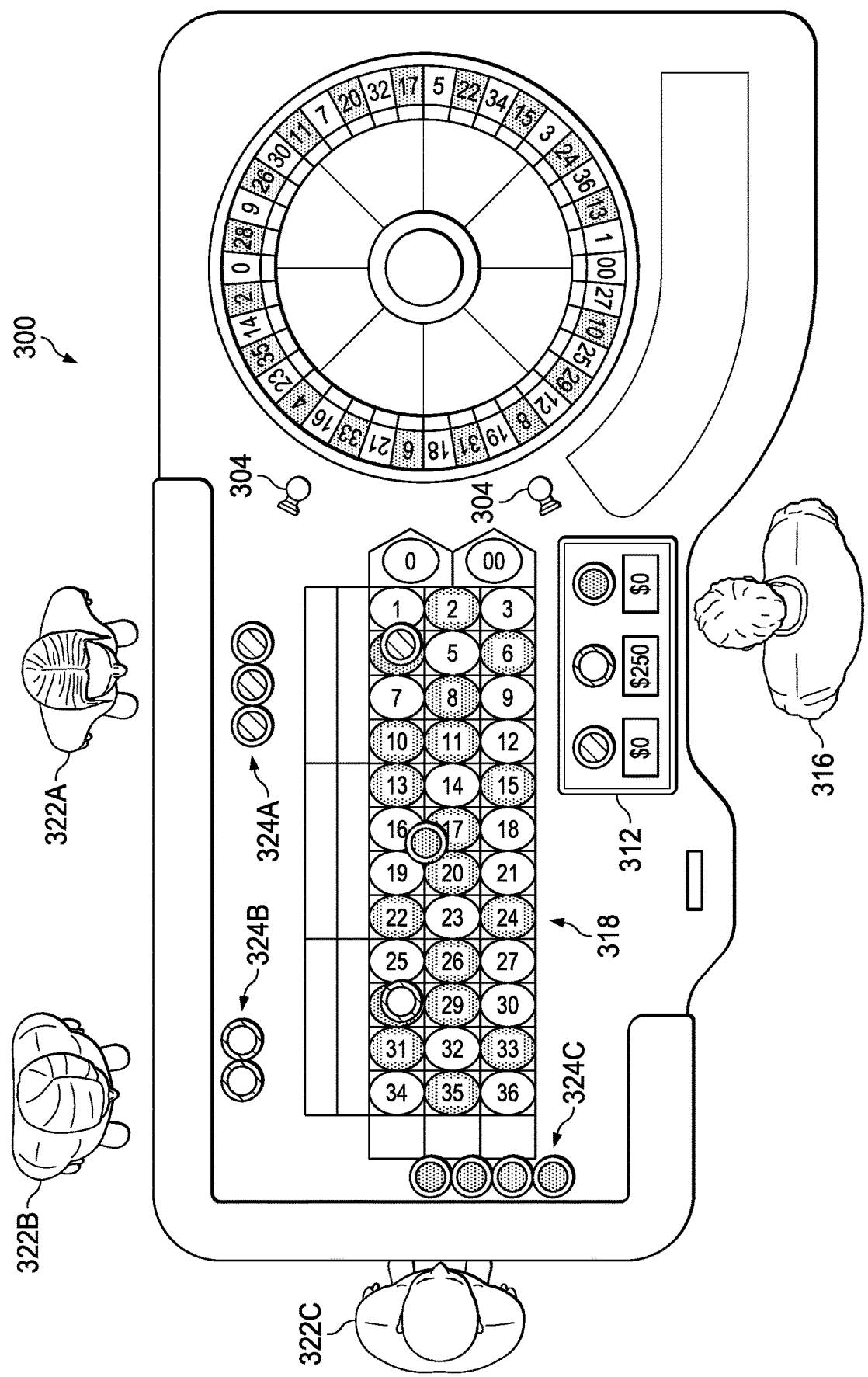
FIG. 5 depicts a simplified diagram of another example table game and associated hardware for intelligent table gaming according to one non-limiting embodiment.

The systems and methods described can be used in conjunction with a variety of different types of table games, including electronic table games and arena-style table gaming. FIG. 5, for instance, depicts a simplified diagram of another example table game and associated hardware for intelligent table gaming according to another non-limiting embodiment. In this embodiment, the table game 300 is roulette having a playing field 318 upon which players 322A-C place wagers using chips 324A-C. The table game 300 can utilize one or more cameras 304 to collect image data associated with the players 322A-C and/or the chips 324A-C. While FIG. 5 schematically shows the cameras 304 positioned on a surface of the table game 300, this disclosure is not so limited. Instead, and similar to FIG. 4, the cameras 304 can be positioned in any suitable orientation to provide the desired field of view. Furthermore, as described in more detail below, other chip tracking technology can be utilized to track betting activity at the table game 300.

In the illustrated embodiment, a dealer 316 is provided information via a dealer interface system 312, which can be generally similar to the dealer interface system 212. The dealer interface system 312 can provide the dealer 316 with payout information, based on the amount of chips wagered by the various players 322A-D and the outcome of the game. In accordance with some embodiments, the dealer interface system 312 can be used to perform other transactions or otherwise provide the dealer 316 with alerts or other data. Additionally, the dealer's payouts can be monitored and tracked to verify accurate payouts to the players 322A-D.

Beyond the tracking of various aspects of gameplay, the cameras positioned proximate to a gaming area, such as cameras 104, 204, and 304, can provide image feeds that can be used for additional processing, tracking, and analysis of other activities occurring in the gaming environment. By way of example, various machine learning, deep learning, or other forms of artificial intelligence can be leveraged to process the image feeds to assess and categorize the behavior of players 122A-D, 222A-D, and 322A-C and/or the dealers 116 and 316. Through this behavioral processing, emotional states of the players, dealers, or other casino personnel can be identified and monitored via the image feeds. When certain emotional states are detected, such as anger, irritation, outrage, etc., appropriate notifications can be automatically provided to security personnel, casino management, police, or other appropriate parties such that action can be taken, as may be needed.

Moreover, cohort analysis can be performed on the image feeds received from the cameras such that interactions between multiple players, or interactions between players and casino personnel can be monitored for the purposes of identifying potential cooperative cheating or other nefarious activities. When certain types of behaviors are detected through artificial intelligence-based analysis of the image feeds, the system can automatically dispatch notifications to appropriate personnel so that the identified situation can be further monitored remotely or security staff can be deployed to investigate. Thus, the safety of the dealer, casino personnel, and other players can be improved through the real-time analysis of player behavior and actions in accordance with the presently disclosed systems and methods.

Moreover, the deployment of the cameras and the real-time processing of their image feeds can be used to confirm, automate, or expedite various processes that are routinely performed on a gaming floor. For example, from a hospitality perspective, the image feeds from the cameras can be used to automatically detect when a player's beverage is low, or detect other hospitality needs. When certain types of hospitality needs are detected, the system can dispatch notifications to appropriate personnel so that the hospitality needs of the player can be addressed. Additionally, the cameras can be used for transaction verification (i.e., player buy-in confirmation) to alleviate the need for a human supervisor to physically approve a transaction. For instance, a player wishing to buy chips at a table can tender cash to a dealer to begin a transaction. The dealer can then count out chips corresponding to the amount of the buy-in and place both the cash and the chip stack on the table surface in the field of view of the camera(s). Instead of seeking approval from a human supervisor, however, the image feed from the camera(s) can be used by the gaming table computing system to determine the amount of cash, determine the amount of chips in the stack, and confirm the two amounts are equal in order to approve the transaction. Beneficially, as the player's identity may be automatically detected through facial recognition, as described herein, the amount of the player's buy-in and the frequency of player's buy-ins can also be logged into their player loyalty profile for player tracking and rating purposes.

Figure 6:
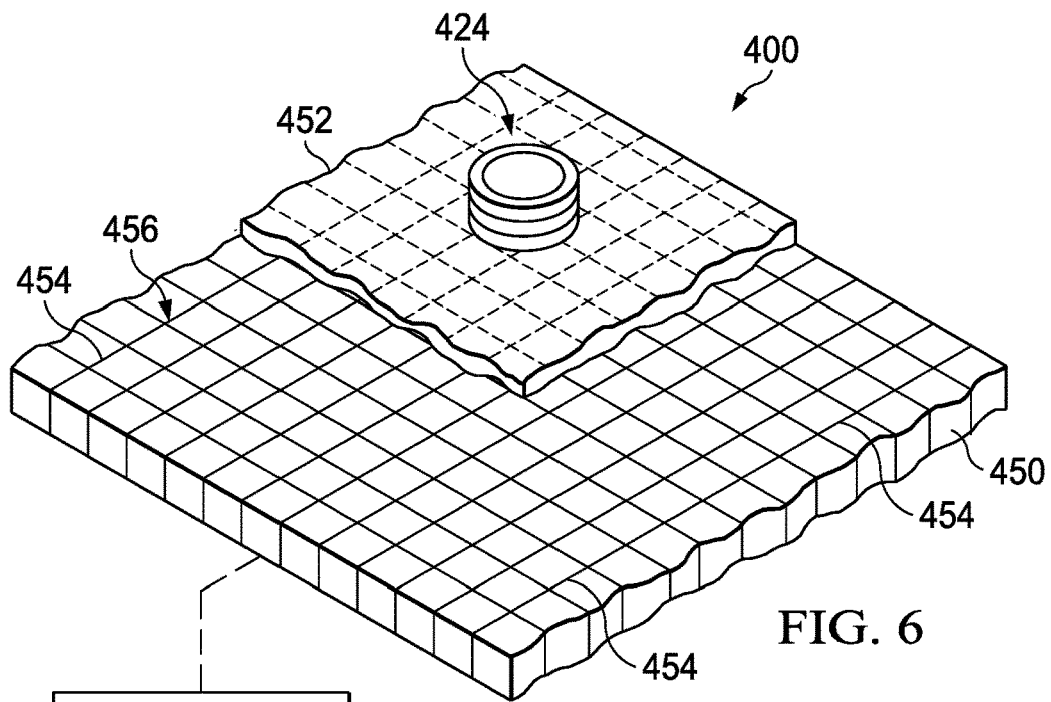
FIG. 6 shows a partial cutaway view of an example table game having an embedded detection grid in accordance with one non-limiting embodiment.
Figure 7:
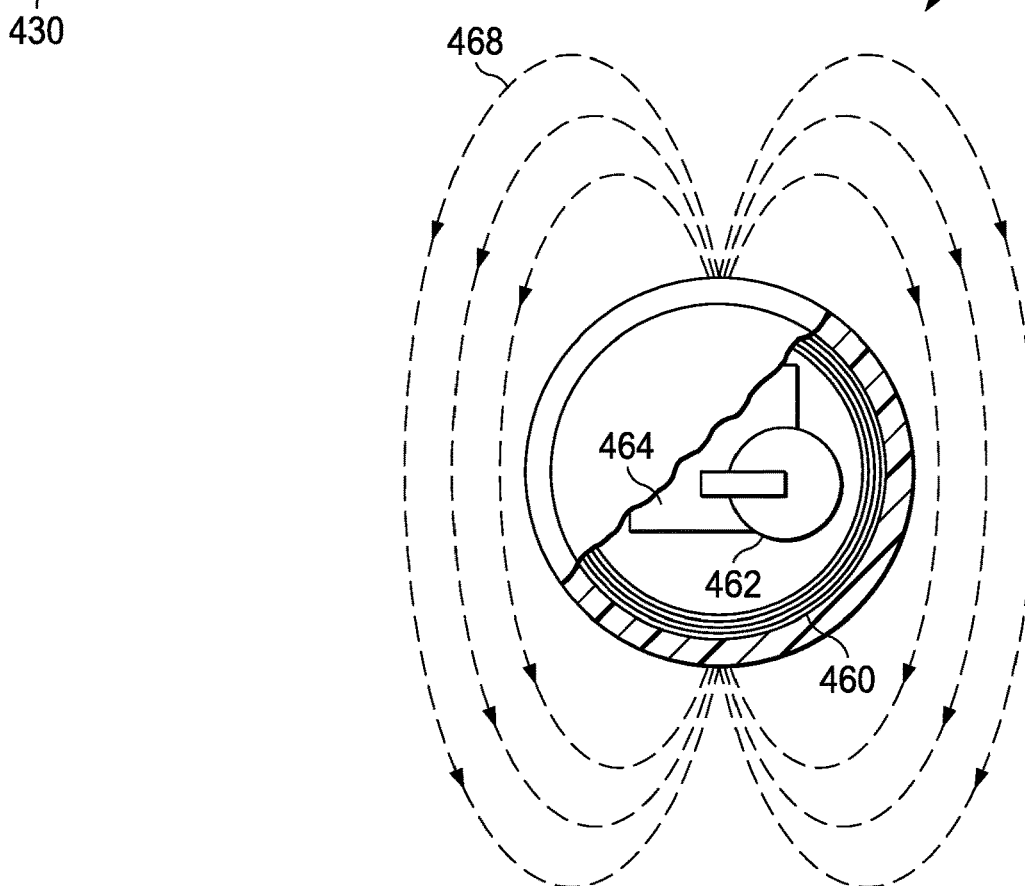
FIG. 7 shows a partial cutaway view of an example chip having a magnetic signature in accordance with one non-limiting embodiment.

Referring now to FIG. 6, a partial cutaway view of an example table game 400 having an embedded detection grid 456 in accordance with one non-limiting embodiment is shown. The table game 400 can be any type of table game found in a gaming environment, such as a blackjack, three card poker, baccarat, roulette, poker, craps, and the like. In this embodiment, the embedded detection grid 456 is a collection of leads 454 that are positioned beneath a top layer 452 of the table game 400. The leads 454 can be mounted, for example, on a substrate 450 of the table game 400 and the top layer 452 can be a felt top that is positioned on top of the leads 454 and the substrate 450. In combination with chips 424 that produce a magnetic field, the detection grid 456 can be usable to determine the relative placement of the chips 424 (i.e., on an X-Y field). In some embodiments, each chip 424 produces a unique, signature magnetic field. In other embodiments, each chip 424 of a certain value produces the same magnetic field. The magnetic field can be created via any suitable technique. FIG. 7 depicts a cutaway view of an example chip 424 that generates a magnetic field 468. The chip 424 can house a coil 460 that is energized to generate the magnetic field 468. The chip 424 can include a circuit board 464 and a power source 462, such as a battery.

When placed on the table game 400, the magnetic field 468 induces a field in one or more of the leads 454 of the detection grid 456 that are proximate to the chip 424, thereby allowing the chip to be detected.

The leads 454 of the detection grid 456 can be in communication with a gaming table computing system 430. Thus, using the magnetic fields detected by various leads 454, the gaming table computing system 430 can ascertain a relative position of the chips 424 on the gaming table 400. Additionally, the gaming table computing system 430 can also store a mapping of the table game playing area in order to associate the position of the chips 424 with the game itself. In the context of roulette, for example, using a detection grid positioned beneath the playing field of numbers, the gaming table computing system 430 can determine upon which number the bet is placed. As is to be appreciated, however, other table games can be mapped such that the gaming table computing system 430 can monitor chip locations, as may be appropriate. Referring back to FIG. 1, for example, a detection grid 454 can be positioned under the table game surface 102 and the location of the two dimensional betting fields 120A-D can be mapped. Beneficially, using the detection grid 456 described herein, a gaming operator can remove the top layer 452 and replace with a new top layer to provide for a different table game. The game layout of the new game can be mapped such that gameplay can be tracked accordingly.

Figure 8A:
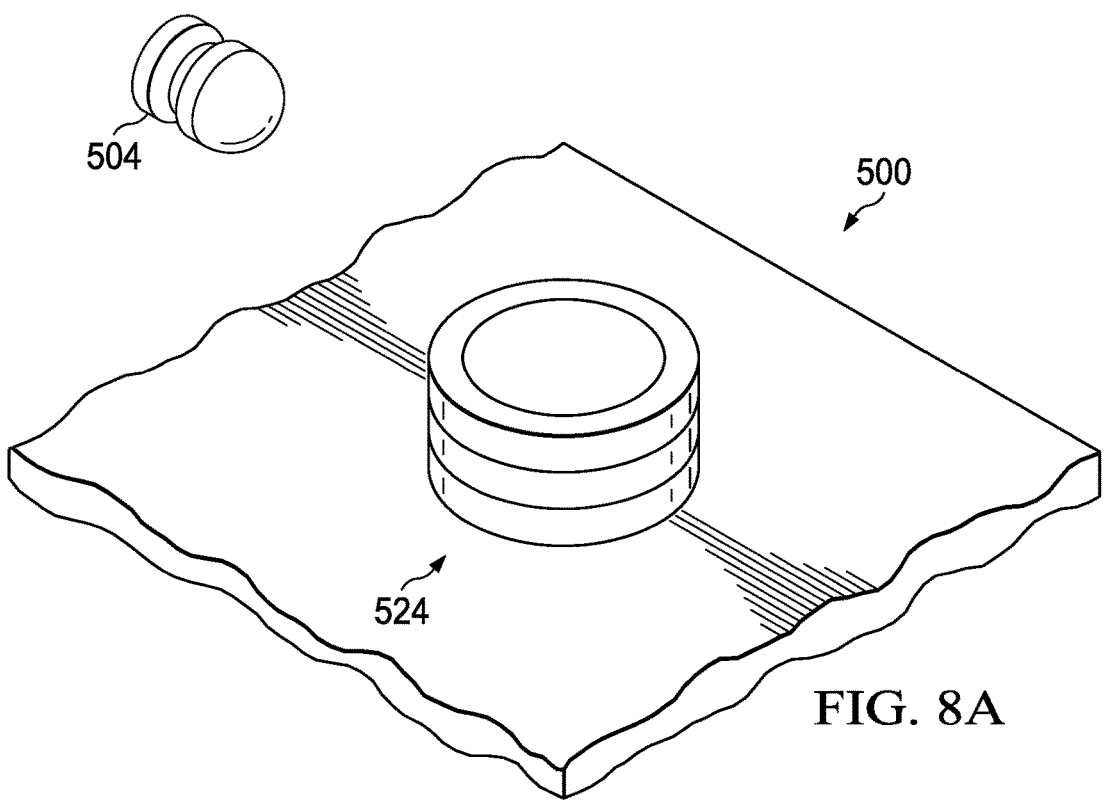
FIGS. 8A-8B depict example chips and table gaming having markings that are not detectable with the human eye in accordance with one non-limiting embodiment.
Figure 8B:
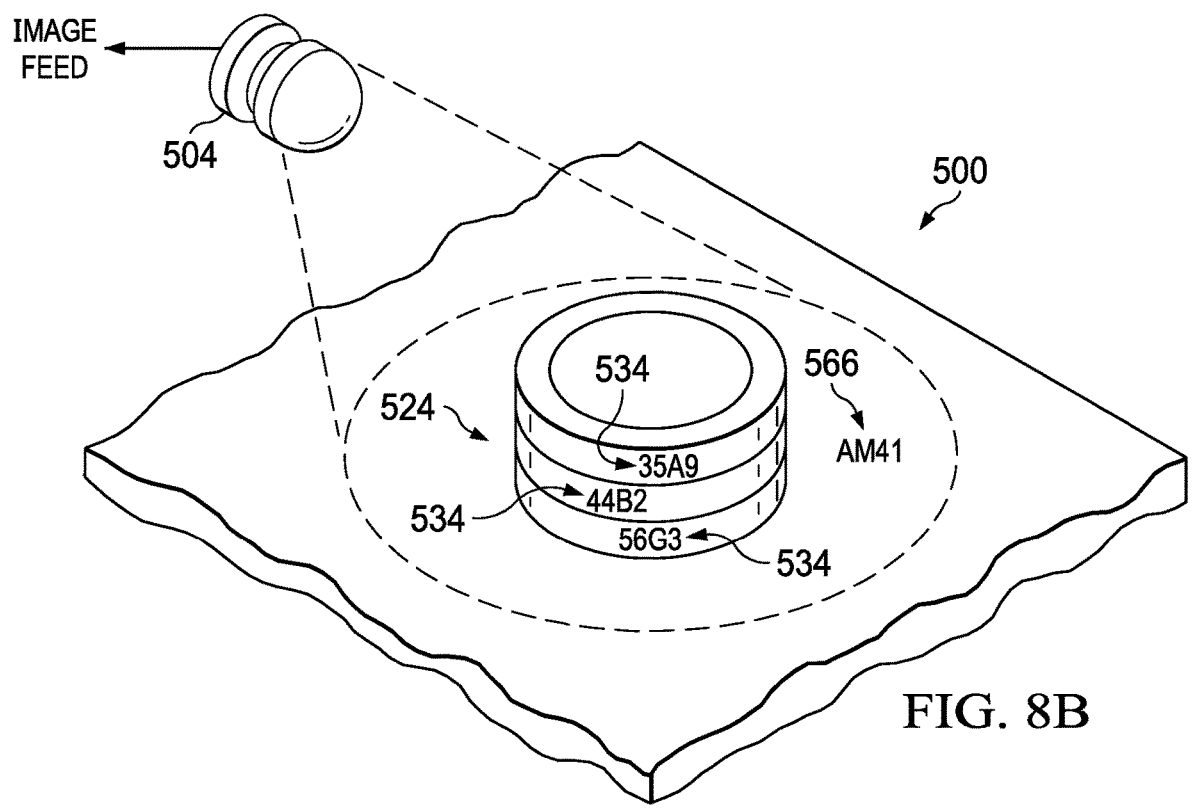

In accordance with the present disclosure various techniques can be used to determine a chip's value. In some embodiments, the system is trained to associate particular chip colorations with particular denominations. Through the image analysis of chips in a stack placed in a betting position, the system can identify the coloration of each chip in the stack, determine its corresponding denomination, and then tally the amount of funds represented by the chip stack. In other embodiments, chips can be specially modified to assist with the chip identification processing. Referring to FIGS. 8A-8B, for instance, chips 524 are shown that include markings 534 that are not visible to the human eye. A specialized camera 504, such as a UV or IR camera, can be utilized to capture the markings 534 from the chips 524 such that the marks can be interpreted through image analytics. The specialized camera 504 can be positioned at any suitable location on a table game as describe herein. In some embodiments, for instance, the markings 534 serve as a serial number of the associated chip 524 that allows the gameplay associated with the chip 524 to be tracked. In accordance with the systems and methods described herein, the chip 524 can be tied with a particular player. Furthermore, in order to provide additional information to an associated gaming table computing system, the table can be printed with markings that are not visible to the human eye but are perceptible using a specialized camera. As shown in FIG. 8B, a table marking 566 can be used by an associated gaming table computing system for various processing, including mapping of the gameplay surface. For instance, the table marking 566 can be tied to a library of known table layouts that are each mapped.

Figure 9:
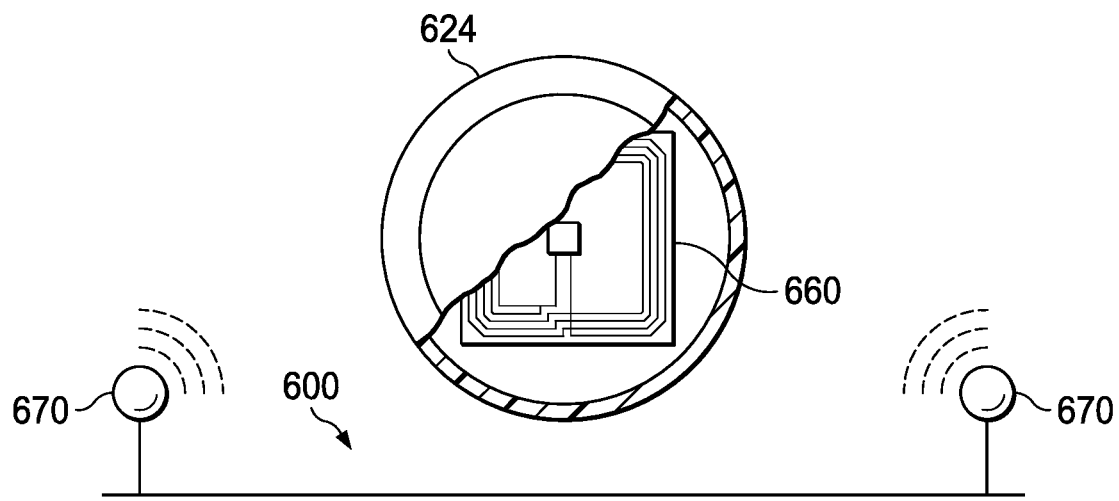
FIG. 9 shows a partial cutaway view of an example chip having an RFID chip in accordance with one non-limiting embodiment.

Additionally or alternatively, the systems and methods described herein can use RFID-based technologies to track chip location. FIG. 9 shows a partial cutaway view of an example chip 624 having an RFID chip 660 in accordance with one non-limiting embodiment. One or more RFID antennas 670 can be positioned at a table game 600 to poll the RFID chip 660. The RFID antennas 670 can be in communication with an associated gaming table computing system. The RFID chip 660 can provide data to the associated gaming table computing system, such as a unique chip serial number, chip value, or other information. In some embodiments, the gaming table computing system can utilize the information received from the RFID chip 660 and various image data collected by cameras, to link certain chips 624 to certain players. The RFID antennas 670 can be positioned on a table game at appropriate locations, as needed. For instance, one or more RFID antennas can be positioned proximate to a dealer tray. A routine can be executed subsequent to each round or hand to poll all of the chips contained within the dealer tray. In this regard, a total value of the chips can be determined before and after a payout event.

Figure 10:
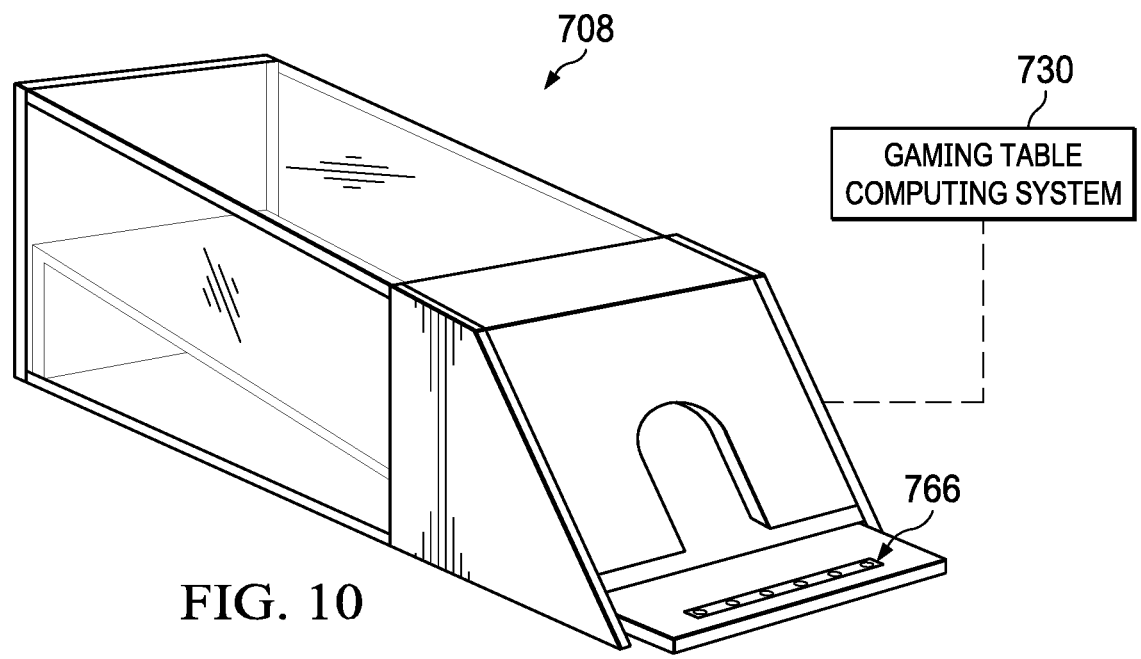
FIG. 10 depicts an example card shoe in accordance with one non-limiting embodiment.
Figure 11:
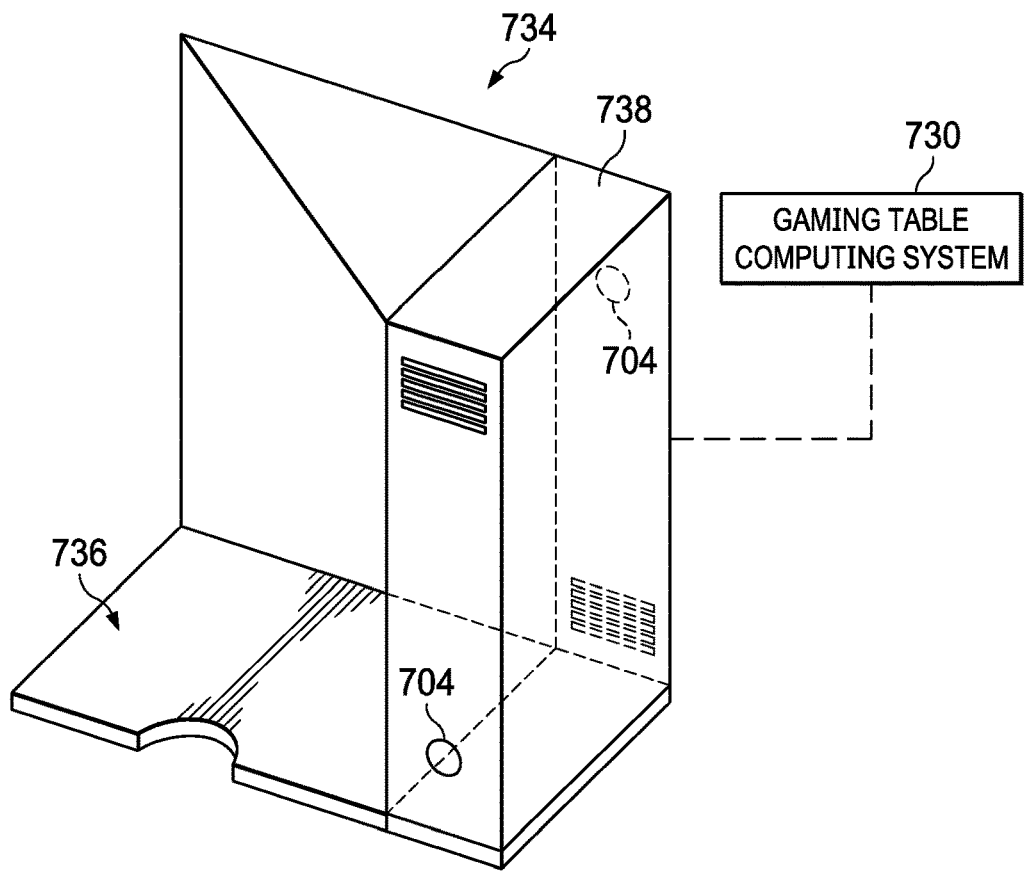
FIG. 11 depicts an example discard rack in accordance with one non-limiting embodiment.

FIGS. 10-11 depict example table top devices in accordance with various embodiments that can provide information to an associated gaming table computing system in real-time. Referring first to FIG. 10, an example card shoe 708 in accordance with one non-limiting embodiment is shown. A card reader 766 is schematically shown on the card shoe 708. The card reader 766 can be incorporated into the card shoe 708 and any suitable location, such as at the discharge ramp. The card reader 766 can be used to read the value and suit of playing cards being dealt from the card shoe 708. In some embodiments, playing cards in the card shoe 708 are printed with specialized markings or microprint that are readable by the card reader 766. In any event, the card shoe 708 can provide information regarding the dealt cards to a gaming table computing system as the dealer is pulling playing cards from the card shoe 708.

FIG. 11 depicts an example discard rack 734 in accordance with one non-liming embodiment. The discard rack 734 can include a card discard portion 736 and also include a hardware compartment 738. The hardware compartment 738 can house various components, such as cameras 704, a power source, circuit boards, cooler fans, and so forth. In some embodiments, the hardware compartment 738 houses a dealer-facing camera 704 and a player-facing camera 704. The discard rack 734 can provide image feeds from the cameras 704 to a gaming table computing system 730. Further, the position of the discard rack 734 relative to the associated table game can be permanently or at least semi-permanently fixed to maintain the desired camera fields of view. The hardware compartment 738 can be relatively unobtrusive, and the cameras 704 can be mounted such that players may not necessarily notice their presence.

Figure 12:
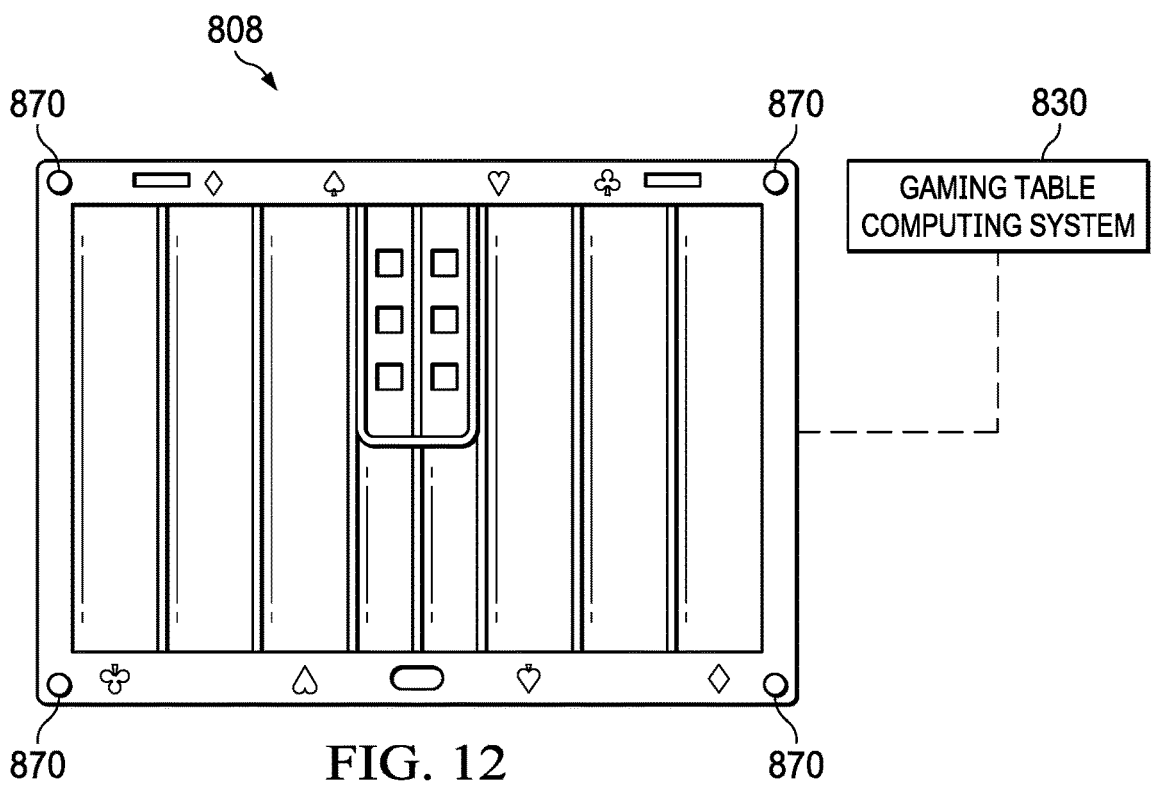
FIGS. 12-14 depict example dealer trays in accordance with various non-limiting embodiments.
Figure 13:
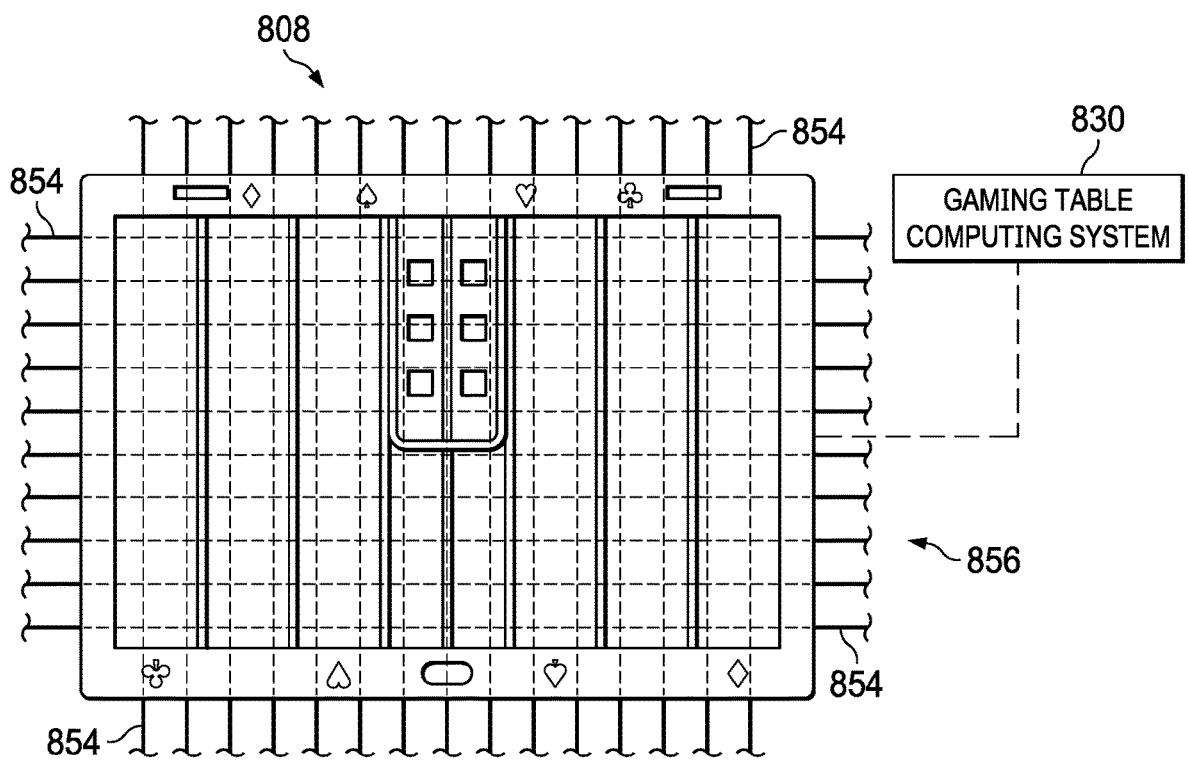
Figure 14:
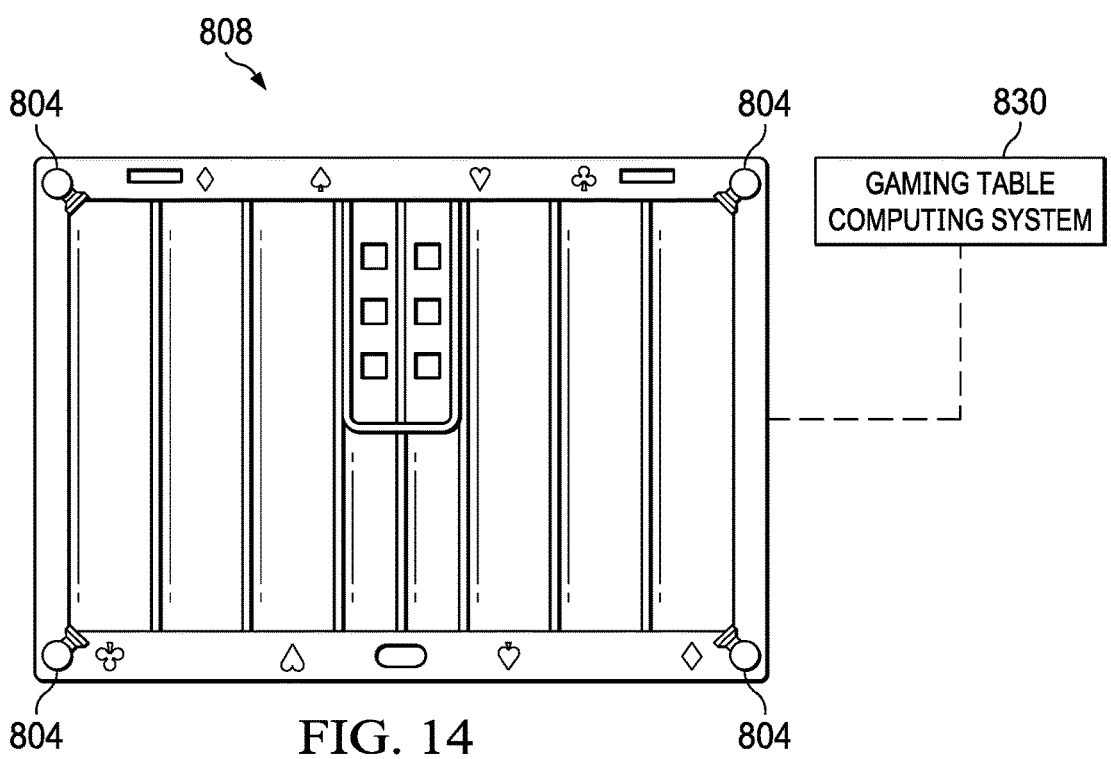

In accordance with the systems and methods described herein, the chips in a dealer tray can be tracked through any suitable tracking techniques. Tracking chips in the dealer tray can beneficially allow the verification of a variety of different processes that occur frequently at a table game, such as buy-ins, color-ups, and payouts, for example. FIGS. 12-14 depict example dealer trays 808, in accordance with various non-limiting embodiments, that are in communication with example gaming table computing systems 830. Referring first to FIG. 12, RFID antennas 870 are mounted directly to, or at least in close proximity with, the dealer tray 808. The RFID antennas 870 can be used to poll the RFID-enabled chips present in the dealer tray 808. As such, polling can occur before and after a payout event, for example. Based on the expected amount of the payout, which is computed based on the bets on the table and the win/loss per player, the gaming table computing system 830 can verify the proper payout amount occurred. If the detected payout amount does not match the expected payout amount, appropriate alerts can be dispatched by the gaming table computing system 830.

Instead of using RFID-enabled chips, some embodiments can utilize magnetic chips (similar to FIG. 7) and a detection grid 856, as depicted in FIG. 13. A series of leads 854 can be positioned beneath the dealer tray 808, or formed into the dealer tray itself, to create the detection grid 856. The detection grid 856 can be a portion of a detection grid of the associated table game, or can be a detection grid solely associated with the dealer tray 808. As described above with regard to FIG. 6, the chips that are present in dealer tray 808 can be tracked by the gaming table computing system 830 in real-time based on the corresponding magnetic fields induced in the detection grid 856.

FIG. 14 schematically depicts the use of cameras 804 to track chips in the dealer tray 808 using image analysis techniques. While FIG. 14 shows a camera 804 position in each corner, it is to be appreciated that any camera having a suitable field of view can be used. For instance, an overhead camera position on table signage, as shown in FIG. 4, can be used to collect dealer tray images.

Figure 15:
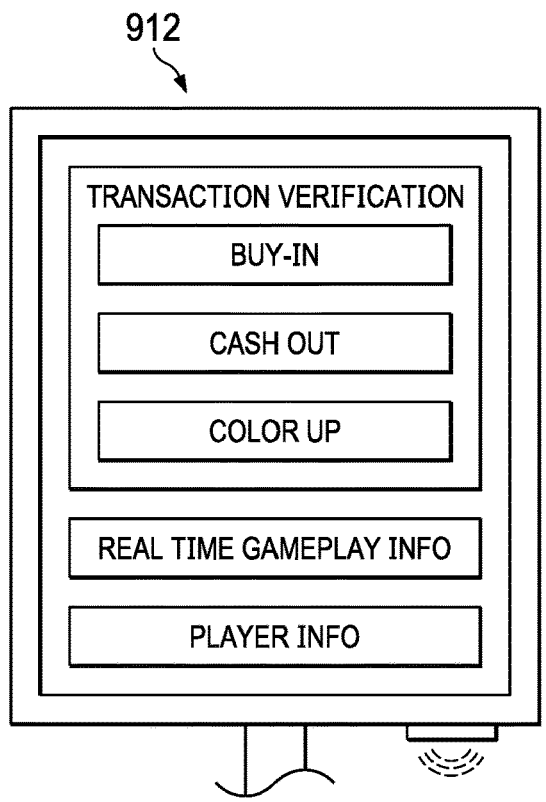
FIGS. 15-18B depict dealer interface systems in accordance with various non-limiting embodiments.
Figure 16:
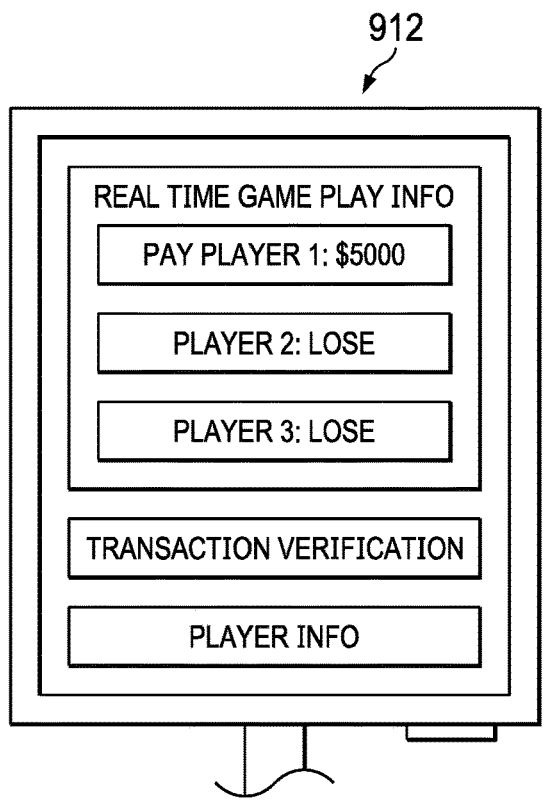
Figure 17:
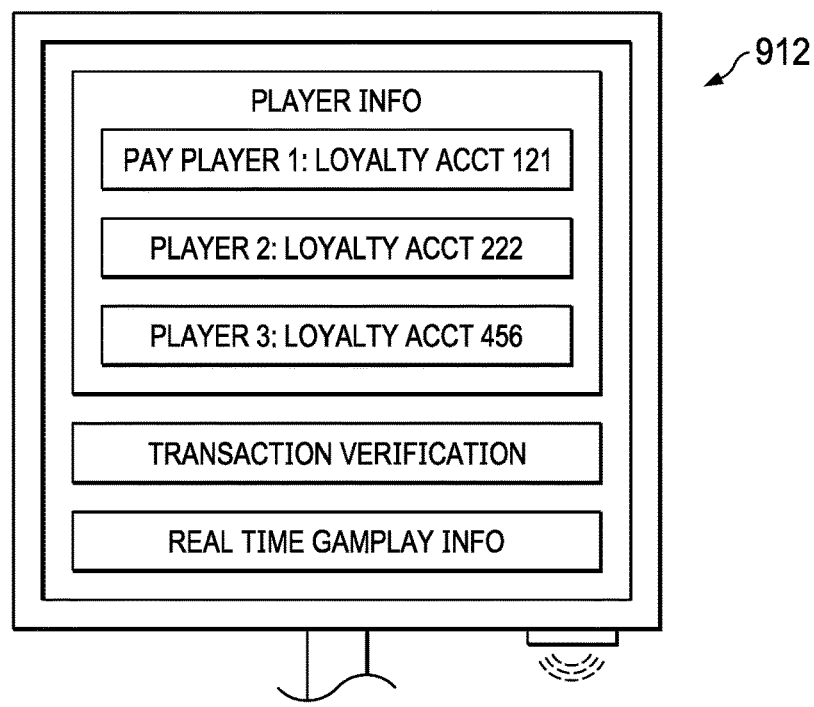

FIGS. 15-17 depict simplified graphical interfaces of a dealer interface system 912 in accordance with various non-limiting embodiments. As provided above, the dealer interface system 912 can be mounted to the side or top of a table game, mounted to or incorporated into a table sign, or positioned proximate to the dealer tray, among other suitable locations. In some embodiments, the dealer interface system 912 can be associated with a wireless or wired tablet or other communication device. The dealer interface system 912 can be used to provide information to a dealer, or other user, and/or receive inputs from a dealer, or other user. Referring first to FIG. 15, the dealer interface system 912 depicts example processes that can be verified, such as a buy-in, a cash out, and a color up. As such, when a player wishes to perform any of these transactions, the dealer can interact with the dealer interface system 912, such as through a touch screen interface, to begin a verification process. With regard to a buy-in, for example, a data feed from a bill reader in a drop slot (such as drop slot 114 in FIG. 1) can provide an amount of currency tendered. Through the tracking of the dealer chip tray, or through optical analysis of the stack of chips passed to the player, the system can verify that the amount of chips that were removed from the chip tray equal the amount of currency fed into the drop slot. Alternatively, instead of relying on a bill reader, the dealer may be prompted to enter the amount of currency tendered by the player. As the currency is spread on the table, cameras can confirm the amount of currency tendered matches the amount of currency entered by the dealer.

As shown in FIG. 16, real time gameplay information can also be provided to the dealer via the dealer interface system 912. While the type of gameplay information conveyed can vary based on the associated game, in some embodiments player payouts based on the outcome of the game can be provided. Further, verification of those payouts, as described herein, can be performed. FIG. 17A depicts the loyalty information related to the players at the table that can be presented on the dealer interface system 912. In some embodiments, the loyalty information is based on facial recognition of the players. In some embodiments, the loyalty information is provided by a player, such as through a NFC interface.

Figure 18A:
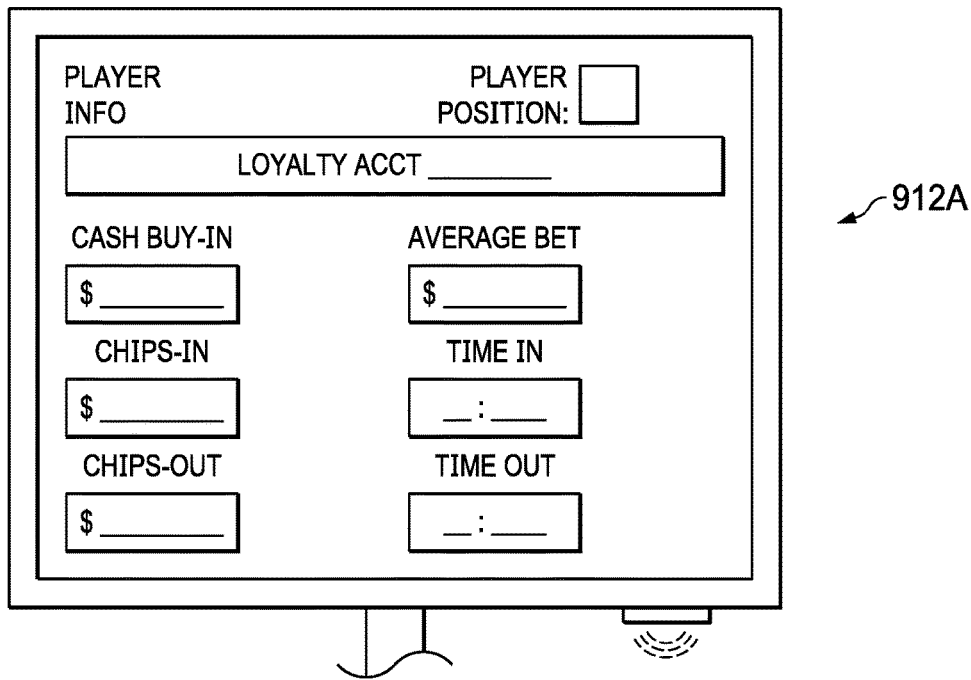
Figure 18B:
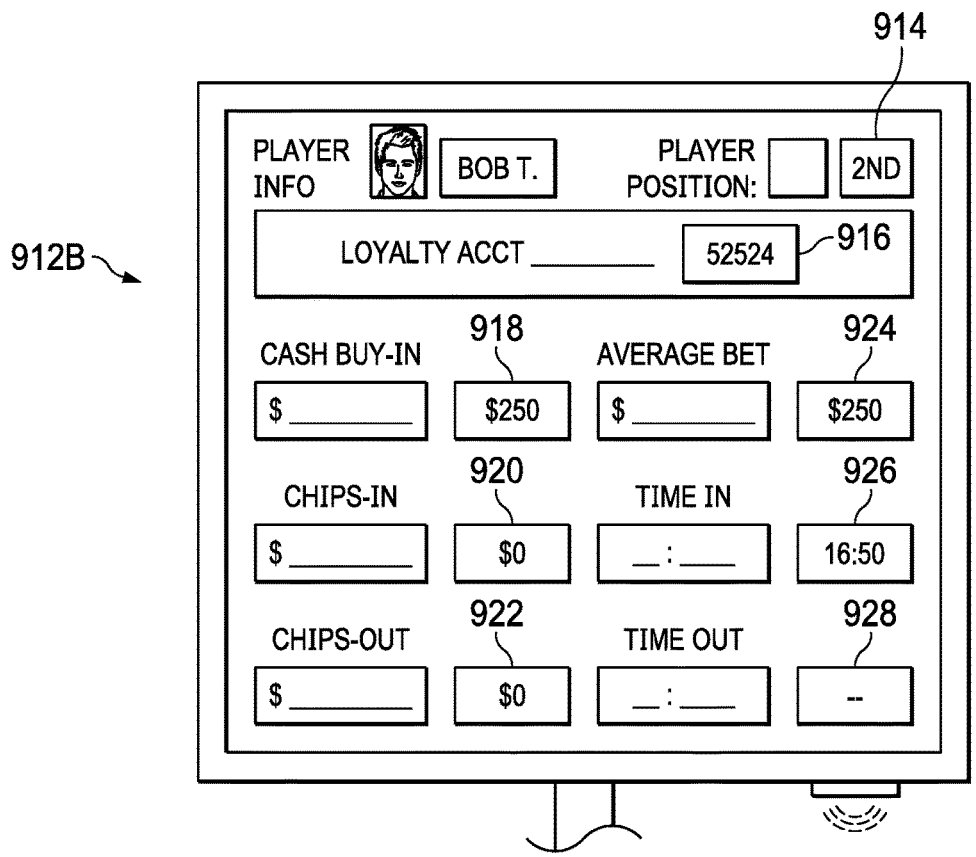

FIGS. 18A-18B depict another example dealer interface system 912A-912B. In this embodiment, various informational overlays are provided to the dealer so that player-specific information can be graphically conveyed to the casino personnel to expedite the input of such information into a player rating system and improve on the accuracy of the entered information. Based on the informational overlays, the casino personnel can then manually enter the information into the interface of a player rating system. The information provided in the overlays (or other types of menus, screens, etc.) can be based on, for example, image analysis of the gameplay in accordance with the present disclosure. Such implementation can beneficially be utilized when there is no direct data integration between the image analysis system and the player rating system, for example. Thus, this approach provides a technique for casino personnel to transfer information that is obtained through video analysis, or other data collection techniques, into legacy casino systems, such as player ratings systems.

Referring first to FIG. 18A, a dealer interface system 912A is schematically shown that includes informational fields for receiving information associated with a player. Subsequent to interacting with and/or observing the player, the various fields are typically populated by casino personnel in order to track a particular player's gameplay. In this embodiment, however, various player information can be graphically provided to the casino personnel to assist with the population of the fields. Referring to FIG. 18B, graphical overlays are schematically depicted that convey information to the casino personnel to assist with the populating the fields of the dealer interface system. Thus, one or more fields of the dealer interface system 912B can be manually populated by the casino personnel based on the information provided in the graphical overlays. In the illustrated embodiment, the graphical overlays are positioned on the dealer interface system 912B immediately beside the corresponding field, however this disclosure is not so limited. Instead, any suitable technique can be used to present player information and or gameplay information on the dealer interface system 912B for use by the dealer or other casino personnel to populate corresponding fields.

In the illustrated embodiment, an associated gaming table computing system has observed a player, identified the player based on facial recognition, identified their corresponding loyalty account, and has tracked their gameplay, in accordance with the present disclosure. As such, a player position overlay 914 conveys the player is sitting in the $2^{nd}$ position at the table. A loyalty account overlay 916 provides the loyalty account identifier of the player. A cash-buy in overlay 918 provides the amount of cash buy-in from player. A chips-in overlay 920 provides the amount of chip buy-in from player. A chips-out overlay 924 provides the amount of chips-out for the player. An average bet overlay 924 provides the player's average bet. The time-in overlay 926 identifies when the player joined the table and the time-out overlay 928 identifies when the player left the table. Using the information provided in the various overlays 914-928, the casino personnel can interact with the dealer interface system 912B to efficiently and accurately enter the information into the appropriate fields. While FIG. 18B provides one example schematic view of example overlays, it is to be readily apparent by one skill in the art at any suitable technique for displaying information gather by the gaming table computing system to casino personnel for entering into the dealer interface system 912B can be utilized. For example, such information can appear in a sidebar, a toolbar, pop-up windows, slide-out menus, among others.

Figure 19:
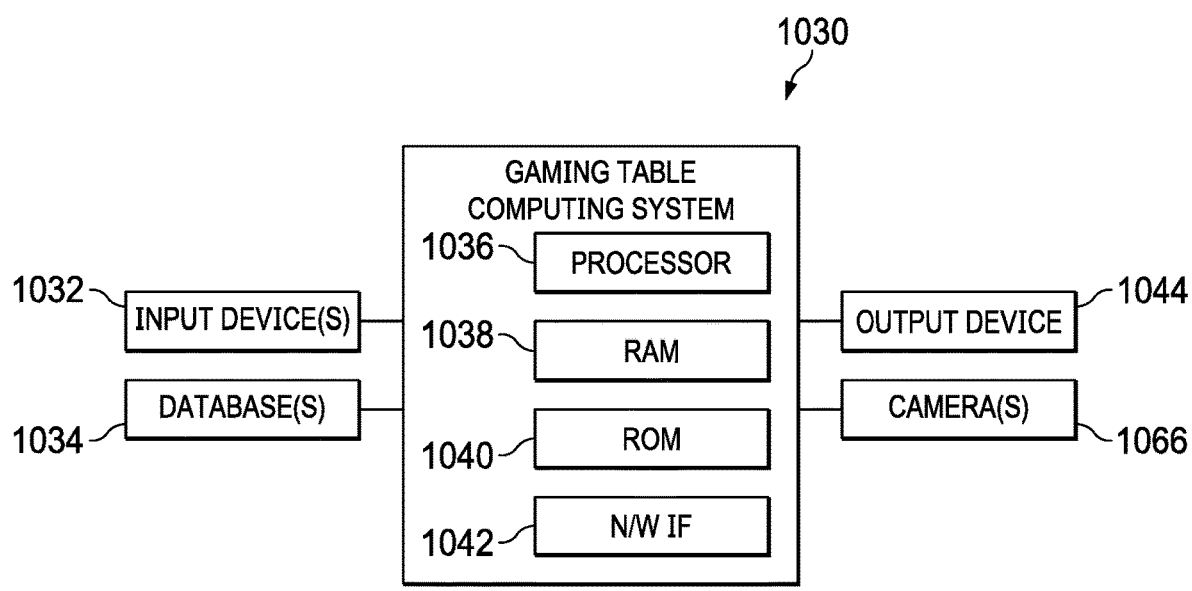
FIG. 19 is a block diagram of an example gaming table computing system in accordance with one non-liming embodiment.

FIG. 19 is a block diagram of an example gaming table computing system 1030 in accordance with one non-liming embodiment which can implement various methods described herein. The computer architecture illustrated in FIG. 19, or variations thereof, can be utilized by a computer running associated with a gaming environment, any server on the system, or any computer/device of any kind operating at table game. A processor 1036 (such as a microprocessor and any associated components) can be connected to an output device 1044 (such as an LCD monitor, touch screen, CRT, etc.) which can be associated with a dealer interface system, for example, or other output device for casino personnel. The processor 1036 can also be connected to an input device 1032 (e.g., buttons, a touch screen, a keyboard, mouse, etc.) which can be used to input any input from a dealer or other user. In some embodiments, the input device 1032 and output device 1044 can be, for example, embedded into a table sign using a touch screen, or can be on a separate device. There can also be multiple output devices 1044 and input devices 1032 that are each connected to the processor 1036. The input devices 1032 can also include other devices described herein, such as card shoes, discard rack, detection grids, and so forth. Methods, features, embodiments, etc., described herein can be performed by the processor 1036 (or multiple such processing units) by loading and executing respective instructions. Multiple such processors can also work in collaboration with each other (in a same or different physical location). The processor 1036 can also be connected to a network interface 1042, which can connect the device to a computer communications network such as the Internet, a LAN, WAN, etc. The processor 1036 can communicate with any other computer, device, server, etc., located in a same or different physical location via the network interface 1042. The processor 1036 is also connected to a RAM 1038 and a ROM 1040. The processor 1036 can also be connected to a storage device, such as a database 1034. A non-transitory computer readable storage medium (e.g., hard disk, CD-ROM, etc.), can store a program which can control the gaming table computing system to perform the methods described herein.

Also connected to the processor 1036 are one or more cameras 1046 which can view an image (still or moving), digitize the image, and transmit the data representing the digitized image to the processing unit (or any other component) so it can be stored and/or analyzed. In another embodiment, the cameras might not be directly connected to the processor 1036 but can be connected via a network stream (e.g., wireless or wired network). In fact, all components may either be directly connected to their connections or indirectly connected (e.g., via a wireless or wired network). Moreover, the cameras 1046 can be any suitable type of camera or optical device, such as IP cameras, IR cameras, UV cameras, black/white cameras, color cameras, thermal cameras, and so forth. While one processing unit is shown, it can be appreciated that one or more such processor can work together (either in a same physical location or in different locations) to combine and communicate to implement any of the methods described herein. Programs and/or data required to implement any of the methods/features described herein can all be stored on any one or more non-transitory computer readable storage medium (volatile or non-volatile, such as CD-ROM, RAM, ROM, EPROM, microprocessor cache, etc.). Processes can be split up among different processors, for example, where some processing can be done by a computer at a gaming table, some by casino server, some by administrator server, etc. The processing can be divided up among different processors in the system in any possible manner (e.g., image processing can be done by the table computer, casino server, administrator server, or any other server/computer on the system, and using any combination of such processors). All processors on the system can communicate with each other (directly or indirectly) by using any type of computer communications network (e.g., internet).

Figure 20:
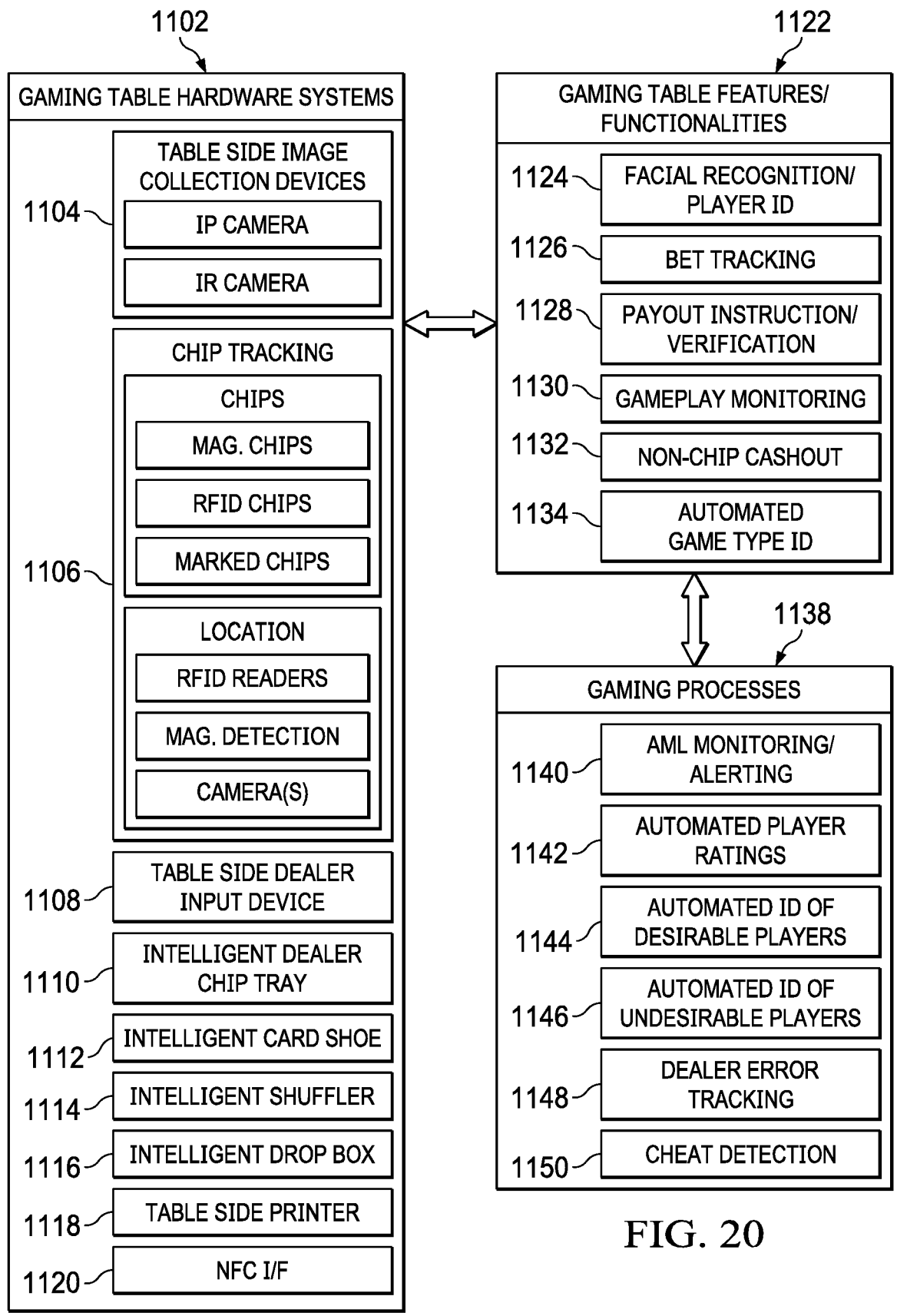
FIG. 20 is a block diagram of example gaming processes enabled by gaming table features/functionalities and associated hardware in accordance with various non-limiting embodiments.

FIG. 20 is a block diagram of example gaming processes enabled by gaming table features/functionalities and associated hardware in accordance with various non-limiting embodiment. By way of example, gaming table hardware systems 1102 can include any of the following devices or systems: table side image collection devices 1104, chip tracking 1106, table side dealer input devices 1108, intelligent dealer chip tray 1110, intelligent card shoe 1112, intelligent shuffler 1114, intelligent drop box 1116, table side printer 1118, and a NFC interface 1120. As described above, the table side image collection devices 1104 can include any suitable type of device, such as, without limitation, IP cameras or IR cameras. Additionally, chip tracking 1106 can be performed by any suitable chip recognition technique, such as using RFID-enable chips, chips having magnetic field, and/or chips having markings that are detectable by specialized cameras. The location of the chips can be tracked using suitable readers, cameras, beacons, or detection grids.

Through the use of the various hardware systems 1102, various gaming table features/functionalities 1122 can be enabled. By way of non-limiting examples, one or more of the following features/functionalities can be performed in accordance with the present disclosure: facial recognition/player identification 1124, bet tracking 1126, payout instruction/verification 1128, gameplay monitoring 1130, non-chip cash out 1132, and automated game type ID 1134. With regard to non-chip cash out 1132, a player, for example, may desire for a voucher to be printed at a tableside printer or for funds to be deposited to a stored value account, such as a PLAY+ account offered by SIGHTLINE PAYMENTS, LLC of Las Vegas, NV. Moreover, with regard to automated game type identification 1134, using image data collected from a table, gameplay parameters can be deduced, such as type of game, payout tables, and so forth. In some embodiments, specialized table markings that are not visible to the human eye, but that are detectable by the computing system, aid in the automated game type identification process 1134.

Through the use of various gaming table features/functionalities 1122, gaming operators or other entities can perform gaming processes 1138, such as, without limitation, AML monitoring/alerting 1140, automated player ratings 1142, automated identification of desirable players 1144, automated identification of undesirable players 1146, dealer error tracking 1148, and cheat detection 1150. With regard to automated player ratings 1142, the rating of a player is performed for understanding the value of the player and how much that player's gameplay is worth to the casino. Casinos typically desire to retain players with strong ratings. In turn, the casino can provide the player with complimentary goods or services. Many casinos utilize a "Rating System" to input the particulars for a player based on their gameplay. Factors used to establish a player's rating may include buy in amounts, average bet amount, hands played, time on table, and so forth. This process, however, becomes tedious and potentially inaccurate if a player plays multiple hands simultaneously or sits out for numerous hands. Further, this process becomes more complex and burdensome to casino staff when casinos elect to reduce the staff that handles the ratings. By way of example, in years past, a supervisor at a casino would have responsibility for handling ratings of players at four tables. In today's casinos, supervisors may be responsible for handling ratings of players at eight or more tables. This approach leaves room for error when determining how many rounds were played by a player and the amount of money the player brought out of their pocket during gameplay. The systems and methods described herein, however, address the difficulties in administrating the conventional ratings systems, as automated bet tracking, win/loss history, and the like can be automatically logged and tabulated.

Examples

A. A computer-based method of gameplay tracking at a table game in a gaming environment, the method performed by a gaming table computing system, the gaming table computing system comprising instructions stored in a memory, which when executed by one or more processors of the gaming table computing system, cause the gaming table computing system to perform the method comprising:
receive an image feed from one or more cameras that are positioned proximate to a table game in a gaming environment;
process the image feed to identify a player at the table game based on facial recognition analysis;
based on the facial recognition analysis, identify a player loyalty account of the player, wherein the player loyalty account is associated with the gaming environment;
process the image feed to determine an amount of a bet placed by the player in a betting field of the table game; and
cause the player loyalty account to be updated based on the amount of the bet placed by the player in the betting field.

B. The computer-based method according to paragraph A, further comprising:
process the image feed to identify an amount of cash tendered by the player to a dealer for a buy-in at the table game; and
subsequent to the dealer retrieving one or more chips from a deal chip tray, process the image feed to confirm that a total value of the one or more chips is equal to the amount of cash tendered by the player.

C. The computer-based method according to paragraph B, further comprising:
subsequent to confirming that the total value of the one or more chips is equal to the amount of cash tendered by the player, provide an authorization approval to a display screen positioned proximate to the table game.

D. The computer-based method according to paragraph B, further comprising:
cause the player loyalty account to be updated based on the amount of the cash tendered by the player.

E. The computer-based method according to any of the preceding paragraphs, further comprising:
process the image feed to determine the amount of each of a plurality of bets placed by the player in the betting field of the table game over a period of time; and
determine an average bet amount placed by the player in the betting field over the period of time.

F. The computer-based method according to paragraph E, further comprising:
cause the player loyalty account to be updated based on the average bet amount placed by the player in the betting field over the period of time.

G. The computer-based method according to any of the preceding paragraph s, further comprising:
process the image feed to determine that the outcome of a gaming event at the table game is a win for the player; based on the amount of the bet placed by the player in a betting field of the table game and the outcome of the gaming event, determine an amount of chips owed to the player;
subsequent to the dealer retrieving one or more chips from a deal chip tray responsive to the outcome of the gaming event, process the image feed to confirm that a total value of the one or more chips is equal to the amount of chips owed to the player.

H. The computer-based method according to paragraph G, further comprising:
cause the player loyalty account to be updated based on the amount of chips owed to the player.

I. A computer-based gameplay tracking system, comprising:
a table game, the table game comprising a table game surface defining a playing area and a betting field;
a plurality of cameras that provide an image feed of gameplay and players at the table game;
a gaming table computing system in communication with the plurality of the cameras, wherein the image feed comprises images of each player at the table game and the image feed comprises images of each bet placed by each player at the table game;
wherein the gaming table computing system is configured to:
process the image feed to identify a player at the table game based on facial recognition analysis;
based on the facial recognition analysis, identify a player loyalty account of the player, wherein the player loyalty account is associated with the gaming environment;
process the image feed to determine a bet placed by the player in the betting field of the table game; and
cause the player loyalty account to be updated based on the amount of the bet placed by the player in the betting field.

J. The computer-based gameplay tracking system according to paragraph I, wherein the plurality of cameras comprises a first camera coupled to a table sign positioned on a first side of the table game and a second camera coupled to a support pole positioned on a second side of the table game, wherein the second camera is at an elevation that is higher than an elevation of the first camera.

K. The computer-based gameplay tracking system according to paragraph J, wherein the plurality of cameras comprises a body camera worn by a dealer at the table game.

L. The computer-based gameplay tracking system according to paragraph J, wherein the table sign comprises a display screen for presenting player loyalty account information for a player at the table game.

M. The computer-based gameplay tracking system according to paragraph L, wherein the gaming table computing system is configured to graphically present information on the display screen associated with the player at the gaming table.

N. The computer-based gameplay tracking system according to any of paragraphs I to M, wherein the gaming table computing system is configured to:
process the image feed to categorize a behavior of the player; and
responsive to the categorized behavior, provide a notification to security personnel.

O. The computer-based gameplay tracking system according to any of paragraphs I to N, wherein the gaming table computing system is configured to:

process the image feed to identify an amount of cash tendered by the player to a dealer for a buy-in at the table game; and subsequent to the dealer retrieving one or more chips from a deal chip tray, process the image feed to confirm that a total value of the one or more chips is equal to the amount of cash tendered by the player.

P. The computer-based gameplay tracking system according to paragraph O, further comprising:

subsequent to confirming that the value of the one or more chips is equal to the amount of cash tendered by the player, provide an authorization approval to a display screen positioned proximate to the table game.

Q. The computer-based gameplay tracking system according to paragraph O, further comprising:

cause the player loyalty account to be updated based on the amount of the cash tendered by the player.

R. A computer-based method, comprising:

receiving, by a gaming table computing system, an image feed from one or more cameras positioned proximate to a table game in a gaming environment;

processing the image feed, by the gaming table computing system, to identify a player at the table game based on facial recognition analysis;

based on the facial recognition analysis, identifying, by the gaming table computing system, a player loyalty account of the player, wherein the player loyalty account is associated with the gaming environment;

determining, by the gaming table computing system, an amount of a bet placed by the player in a betting field of the table game; and causing, by the gaming table computing system, the player loyalty account to be updated based on the amount of the bet placed by the player in the betting field.

S. The computer-based method according to paragraph R, wherein determining the amount of the bet placed by the player in the betting field of the table game comprises processing, by the gaming table computing system, the image feed to determine the amount of the bet placed by the player in a betting field of the table game.

T. The computer-based method according to paragraph R, wherein determining the amount of the bet placed by the player in the betting field of the table game comprises processing, by the gaming table computing system, an RFID-based signal received from the table game responsive to the placement of the bet in the betting field of the table game.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration of the invention for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

The invention claimed is:

1. A computer-based method of gameplay tracking, the method comprising:
   receiving an image feed from a camera that is positioned proximate to a table game in a gaming environment, wherein the image feed captures a plurality of bets placed in a betting field of the table game by a player over time;
   performing image processing of the image feed to determine an amount of each of the plurality of bets placed by the player over the period of time;
   determining an average bet amount placed by the player over the period of time; and
   causing an informational overlay to be graphically displayed on a dealer interface system positioned proximate to the table game, wherein the dealer interface system comprises a screen displaying an average bet input field, and wherein the informational overlay graphically displays the determined average bet amount of the player for manual entry of the determined average bet amount into the average bet input field by a user of the dealer interface system.

2. The computer-based method of claim 1, further comprising:
   performing image processing of the image feed to identify an amount of cash tendered by the player to a dealer for a buy-in at the table game; and
   subsequent to the dealer retrieving one or more chips from a deal chip tray, performing image processing of the image feeds to confirm that a total value of the one or more chips is equal to the amount of cash tendered by the player.

3. The computer-based method of claim 2, wherein the dealer interface system comprises a buy-in amount input field and the informational overlay displays a buy-in amount based on the identified amount of cash tendered by the player for manual entry of the buy-in amount into the buy-in amount input field by the user of the dealer interface system.

4. The computer-based method of claim 2, further comprising:
   causing a player loyalty account to be updated based on the amount of the cash tendered by the player.

5. The computer-based method of claim 1, further comprising:
   performing image processing of the image feed to determine that the outcome of a gaming event at the table game is a win for the player;
   based on the amount of a bet placed by the player in a betting field of the table game associated with the gaming event and the outcome of the gaming event, determining an amount of chips owed to the player; and
   subsequent to the dealer retrieving one or more chips from a deal chip tray responsive to the outcome of the gaming event, performing image processing of the image feed to confirm that a total value of the one or more chips is equal to the amount of chips owed to the player.

6. The computer-based method of claim 5, further comprising:
   causing a player loyalty account to be updated based on the amount of chips owed to the player.

7. A computer-based gameplay tracking system, comprising:
   a table game, the table game comprising a table game surface defining a playing area and a betting field;
   a table sign positioned proximate to the table game, wherein the table sign comprises
   a dealer interface system; and
   a camera;
   a gaming table computing system in communication with the first camera, wherein an image feed from the camera comprise images of bets placed by each of a plurality of players at the table game over a period of time;
   wherein the gaming table computing system is configured to:
   process the image feed to determine an average bet amount for each of the plurality of players; and
   cause an informational overlay to be graphically displayed on the dealer interface system, wherein the dealer interface system comprises a screen displaying an average bet amount input field, and wherein the informational overlays displays the average bet amount for one of the plurality of players for manual entry into the average bet amount input field.

8. The computer-based gameplay tracking system of claim 7, wherein the camera is first camera, the computer-based gameplay tracking system further comprising a second camera, wherein an image feed from the second camera comprise images of bets placed by each of a plurality of players at the table game over a period of time.

9. The computer-based gameplay tracking system of claim 7, wherein the second camera is positioned at an elevation that is higher than an elevation of the first camera relative to the table game surface.

10. The computer-based gameplay tracking system of claim 9, wherein the second camera is worn by a dealer at the table game.

11. The computer-based gameplay tracking system of claim 7, wherein the gaming table computing system is configured to:
    process the image feed to categorize a behavior of each of the plurality of players; and
    responsive to the categorized behavior, provide a notification to security personnel.

12. The computer-based gameplay tracking system of claim 7, wherein the gaming table computing system is configured to:
- process the image feed to identify an amount of cash tendered by one of the plurality of players to a dealer for a buy-in at the table game; and
- subsequent to the dealer retrieving one or more chips from a deal chip tray, process the image feed to confirm that a total value of the one or more chips is equal to the amount of cash tendered by the player.

13. The computer-based gameplay tracking system of claim 12, wherein the screen of the dealer interface system displays player loyalty account information for at least one of the plurality of players at the table game.

14. The computer-based gameplay tracking system of claim 13, further comprising:
- cause the player loyalty account to be updated based on the amount of the cash tendered by the player.

15. A computer-based method, comprising:
- receiving, by a gaming table computing system, an image feed from a camera having a field of view, wherein at least part of a surface of a table game is within a field of the camera, and wherein the least part of the surface of the table game is within the field of the view of the camera comprises a betting field;
- determining, by processing of the image feed, an amount of each of a plurality of bets placed by a player in the betting field over a period of time;
- determining, by the gaming table computing system, an average bet amount of the player over the period of time; and
- causing an informational overlay to be graphically displayed on a dealer interface system positioned proximate to the table game, wherein the dealer interface system comprises a screen displaying an average bet input field, and wherein the informational overlay displays the determined average bet amount of the player for manual entry into the average bet input field.

16. The computer-based method of claim 15, wherein the method further comprises:
- determining, by processing of the image feed, an amount of cash tendered by one of the plurality of players to a dealer for a buy-in at the table game; and
- subsequent to the dealer retrieving one or more chips from a deal chip tray, determining, by processing of the image feed, that a total value of the one or more chips is equal to the amount of cash tendered by the player.

17. The computer-based method of claim 16, wherein the screen displays a buy-in amount input field, and wherein the informational overlay displays a buy-in amount based on the identified amount of cash tendered by the player.

18. The computer-based method of claim 15, further comprising:
- receiving, by the gaming table computing system, an additional image feed from an additional camera, wherein the least part of the surface of the table game is within a field of the view of the additional camera.

19. The computer-based method of claim 18, wherein determining the amount of each of the plurality of bets placed by the player in the betting field over a period of time is further based on the processing of the additional image feed.

20. A computer-based method of claim 15, further comprising:
- determining, by processing of the image feed, an amount of each of a plurality of bets placed by each of the plurality of players over the period of time;
- determining, by the gaming table computing system, an average bet amount of each of the plurality of players over the period of time, wherein informational overlay displays the determined average bet amount for at least one of the plurality of players for manual entry into the average bet input field.

* * * * *

UNITED STATES PATENT AND TRADEMARK OFFICE
CERTIFICATE OF CORRECTION

PATENT NO. : 12,300,060 B2  
APPLICATION NO. : 18/210311  
DATED : May 13, 2025  
INVENTOR(S) : Steven L. Nagata et al.

Page 1 of 1

It is certified that error appears in the above-identified patent and that said Letters Patent is hereby corrected as shown below:

In the Claims

Column 20, Claim 7, Line 45, change "displays" to --display--;
Column 20, Claim 8, Line 49, change "camera is first camera" to --camera is a first camera--;
Column 21, Claim 14, Line 17, change "cause" to --causing--;
Column 21, Claim 15, Line 24, change "game is within" to --game that is within--.

Signed and Sealed this
Seventeenth Day of June, 2025

Coke Morgan Stewart
*Acting Director of the United States Patent and Trademark Office*